United States Patent [19]

Verstegen et al.

[11] 4,441,049
[45] Apr. 3, 1984

[54] LUMINESCENT MATERIAL AND DISCHARGE LAMP CONTAINING THE SAME

[75] Inventors: Judicus M. P. J. Verstegen; Johannus G. Verlijsdonk; Emiel P. J. De Meester; Willebrordus H. M. M. Van de Spijker; Johannes G. Verriet, all of Eindhoven, Netherlands

[73] Assignee: U.S. Philips Corporation, New York, N.Y.

[21] Appl. No.: 450,488

[22] Filed: Dec. 16, 1982

Related U.S. Application Data

[60] Division of Ser. No. 144,731, Apr. 28, 1980, Pat. No. 4,382,207, which is a division of Ser. No. 876,826, Feb. 10, 1978, abandoned, which is a continuation of Ser. No. 699,344, Jun. 24, 2976, abandoned, which is a continuation of Ser. No. 410,184, Oct. 26, 1973, abandoned.

[30] Foreign Application Priority Data

Nov. 3, 1972 [NL] Netherlands ............... 7214862

[51] Int. Cl.³ ............................................. C09K 11/463
[52] U.S. Cl. ................................. 313/486; 252/301.4 R
[58] Field of Search ................... 252/301.4 R; 313/486

[56] References Cited

U.S. PATENT DOCUMENTS 2,590,411  3/1952  Isenberg ............... 252/301.4 R X
3,597,365  8/1971  Ward ..................... 252/301.4 R
4,088,922  5/1978  Wolfe .................... 252/301.4 R X
4,246,630  1/1981  Wolfe .................... 252/301.4 R X

FOREIGN PATENT DOCUMENTS 2261424  7/1973  Fed. Rep. of Germany ... 252/301.4 R

Primary Examiner—Jack Cooper
Attorney, Agent, or Firm—Norman N. Spain

[57] ABSTRACT

A luminescent screen provided with a luminescent material having the hexagonal crystal structure, which material is an aluminate, a gallate or an aluminate gallate. The crystal structure of the luminescent material corresponds to that of at least one of the compounds $\beta$-aluminium, $\beta''$-alumina and the hexagonal ferrites. The luminescent material is activated by at least one of the elements manganese, europium, lead, thallium, cerium, indium, terbium, dysprosium and bismuth and is a ternary compound whose composition can be represented in the ternary phase diagram ABC in which A represents at least one of the oxides $\frac{1}{2}Na_2O$, $\frac{1}{2}K_2O$, $\frac{1}{2}Rb_2O$, $\frac{1}{2}Cs_2O$, CaO, SrO, BaO, $\frac{1}{3}La_2O_3$, $\frac{1}{3}Ce_2O_3$, $\frac{1}{3}Tb_2O_3$, $\frac{1}{3}Dy_2O_3$, $\frac{1}{3}Bi_2O_3$, EuO, PbO, $\frac{1}{2}Tl_2O$ and $\frac{1}{2}In_2O$, in which B represents at least one the oxides $Al_2O_3$ and $Ga_2O_3$ in which up to 25 mol. % of the oxides denoted by B may be replaced by $Sc_2O_3$ and in which C represents at least one of the oxides MgO, ZnO, BeO, $\frac{1}{2}LiAlO_2$ and $\frac{1}{2}LiGaO_2$. The content of A is more than zero and less than that of B and the content of C is more than zero and less than 0.6.

4 Claims, 12 Drawing Figures

LUMINESCENT MATERIAL AND DISCHARGE LAMP CONTAINING THE SAME

This is a division of application Ser. No. 144,731, filed Apr. 28, 1980, now U.S. Pat. No. 4,382,207, which is a division of Ser. No. 876,826, filed Feb. 10, 1978, abandoned, which is a continuation of Ser. No. 699,344, filed June 24, 1976, abandoned, which is a continuation of Ser. No. 410,184, filed Oct. 26, 1973, abandoned.

The invention relates to a luminescent screen provided with a luminescent material having a hexagonal crystal structure, which material is an aluminate, a gallate or an aluminate gallate. Furthermore the invention relates to mercury vapour discharge lamps and cathode-ray tubes provided with such a luminescent screen, to the luminescent material itself and to a method of preparing such an aluminate or aluminate gallate.

It is known that manganese can be used as an activator in gallates and in aluminates which have the spinel crystal structure (cubic crystal symmetry). Particularly manganese-activated magnesium gallate ($MgGa_2O_4$) is a very efficient luminescent material which upon excitation by ultraviolet radiation or by electrons has an intensive green emission with a maximum in the spectrum at a wavelength of approximately 510 nm. (see U.S. Pat. No. 3,407,325).

Netherlands Patent Application No. 6,702,017 describes luminescent manganese-activated magnesium gallates having the spinel structure in which gallium is partly replaced by aluminium. This replacement has a favourable influence on the properties of the luminescent material, notably on the temperature dependence of the luminous flux upon excitation by ultraviolet radiation.

The manganese-activated aluminates having the spinel structure (for example, $MgAl_2O_4$ and $ZnAl_2O_4$) are efficient luminescent materials only when they are excited by electrons (see the book by F. A. Kröger: "Some Aspects of the Luminescence of Solids", 1948).

The aluminates defined by the formula $MeO.6Al_2O_3$ in which Me represents one or more of the alkaline earth metals calcium, strontium and barium may have satisfactory luminescent properties when the activation is suitably chosen. These aluminates are crystalline compounds having a hexagonal crystal symmetry. They have a crystal structure analogous to that of the compounds of the group of the so-called hexagonal ferrites (for example, $BaO.6Fe_2O_3$ having the magnetoplumbite structure). Activation of these hexagonal aluminates by manganese is known from the said book by Kröger and yield materials which luminesce efficiently only when they are excited by electrons. Luminescent materials which are efficient when excited by ultraviolet radiation are obtained if the hexagonal aluminates are activated by bivalent europium (see Netherlands Patent Application No. 6,715,823). Furthermore U.S. Pat. No. 3,502,592 describes the activation of the hexagonal aluminates by europium together with terbium.

The above-mentioned book by Kröger states the luminescence upon excitation by electrons of manganese-activated aluminates defined by the formula $A_2O.11Al_2O_3$ in which A represents one of the alkali metals sodium, potassium and lithium. The sodium and potassium compounds have the hexagonal crystal structure of β-alumina which is likewise closely related to that of the hexagonal ferrites. The book states about lithium aluminate that it has a cubic crystal symmetry and consists at least partly of spinel crystals.

Activation by europium or by europium and manganese of compounds defined by the formula $A_2O.6Al_2O_3$ (in which A represents sodium and/or potassium) is described in U.S. Pat. No. 3,577,350. The greater part of these materials probably consists of the low temperature modification of β-alumina (likewise hexagonal) which is often denoted by β'''-alumina and is generally defined by the formula $A_2O.5Al_2O_3$.

Manganese-activated aluminates, gallates and aluminate gallates are known from U.S. Pat. No. 3,576,757. The fundamental lattice of these luminescent materials is defined by the formula $A_2O.5M_2O_3$ in which A represents lithium, sodium and/or potassium and M represents aluminium and/or gallium. It is known that the lithium compound according to this formula has the spinel structure. The sodium and potassium compounds according to this formula probably have the structure of β'''-alumina.

United Kingdom Patent Specification No. 1,191,014 describes the luminescence of compounds having the β-alumina structure defined by the formula $xCe_2O_3.yAl_2O_3$ in which the ratio x:y is between 1:8 and 1:13. These materials may furthermore comprise manganese as an activator.

The above-mentioned group of the hexagonal ferrites consists of a large number of compounds having a closely related crystal structure. In addition to the mentioned $BaO.6Fe_2O_3$ (having the magnetoplumbite structure) which is often denoted by the character M a number of ternary compounds are known whose unit cell is built up from spinel blocks which are connected together by layers having a deviating structure. A spinel block is, for example, $Fe^{II}Fe_2^{III}O_4$ and is denoted by the character S. The said layers of deviating structure incorporate a large positive ion (ion radius not less than 0.9 Å), for example, barium. It is common practice to denote these compounds by characters. Known are, for example, the compounds Y: $Ba_2Zn_2^{II}Fe_{12}^{III}O_{22}$, W: $BaFe_2^{II}Fe_{16}^{III}O_{27}$,
X: $Ba_2FE_2^{II}Fe_{28}^{III}O_{46}$, and Z: $Ba_3Co^{II}Fe_{24}^{III}O_{41}$
(see the article by Braun in Philips Research Reports 12 (1957) pages 491–548). This series of compounds can greatly be extended by a large number of so-called poly-types. All these polytypes are formed by combinations of the compounds Y, M and S (see the publications by Kohn and Eckart in Zeitschrift für Kristallographie, 119 (1964), pages 454–464, J. Applied Physics, 35, no. 3, part II (1964) page 968, and J. Applied Physics, 36 no. 3, part II (1965) page 1171). Furthermore it is known that similar polytypes can be obtained from β-alumina (and also from β''alumina). Likewise as β-alumina the polytypes derived therefrom have a crystal structure which is mite similar to that of the hexagonal ferrites. The spinel (S) does not belong to the above-described class of structures because it has a cubic symmetry.

Experiments which have led to the invention have shown that a large number of novel compounds can be obtained if in the above-mentioned compounds Y, X, W and Z and further polytypes the small bivalent ion ($Fe^{II}$, $Zn^{II}$, $Co^{II}$) is replaced by $Mg^{II}$ and the trivalent ion ($Fe^{III}$) is replaced by $Al^{III}$ and/or $Ga^{III}$. The hexagonal crystal structure (analogous to that of the hexagonal ferrites) is then maintained. Furthermore it was found that novel compounds can likewise be obtained by either completely or partly replacing aluminium by gallium in the polytypes of β-alumina and β''-alumina with the crystal structure being maintained.

According to the invention a luminescent screen is provided with a luminescent material having a hexagonal crystal structure which material is an aluminate, a gallate or an aluminate gallate, and is characterized in that the crystal structure of the luminescent material corresponds to that of at least one of the compounds β-alumina, β''-alumina and the hexagonal ferrites, the luminescent material being activated by at least one of the elements manganese, europium, lead, thallium, cerium, indium, terbium, dysprosium and bismuth, the luminescent material being a ternary compound whose composition can be represented in the ternary phase diagram ABC in which A represents at least one of the oxides $\frac{1}{2}Na_2O$, $\frac{1}{2}K_2O$, $\frac{1}{2}Rb_2O$, $\frac{1}{2}Cs_2O$, CaO, SrO, BaO, $\frac{1}{2}La_2O_3$, $\frac{1}{2}Ce_2O_3$, $\frac{1}{2}Tb_2O_3$, $\frac{1}{2}Dy_2O_3$, $\frac{1}{2}Bi_2O_3$, EuO, PbO, $\frac{1}{2}Tl_2O$ and $\frac{1}{2}In_2O$, in which B represents at least one of the oxides $Al_2O_3$ and $Ga_2O_3$ in which up to 25 mol % of the oxides denoted by B may be replaced by $Sc_2O_3$ and in which C represents at least one of the oxides MgO, ZnO, BeO, $\frac{1}{2}LiAlO_2$ and $\frac{1}{2}LiGaO_2$, the content of A being more than zero and less than that of B and the content of C being more than zero and less than 0.6, the manganese concentration being not more than 10 at.% calculated with respect to the total number of metal atoms of the oxides B and C in which manganese partly or completely replaces the metal of the oxide C and furthermore also replaces part of the metal of the oxide B if the manganese concentration is larger than the quantity of metal atoms of the oxide C available for replacement.

A luminescent screen according to the invention comprises a luminescent aluminate, gallate or aluminate gallate in which aluminium and/or gallium may be replaced by scandium up to a maximum of 25 mol%. Replacement of small quantities of aluminium and/or gallium by scandium generally has little influence on the luminescence properties of the luminescent materials and does not yield extra advantages. The use of the expansive element scandium is furthermore less desirable because costly materials are then obtained. When replacing more than 25 mol.% of aluminium dn/or gallium by scandium materials are obtained which are less suitable for practical purposes because of their low brightness or luminous flux. The crystal structure of the luminescent materials according to the invention is closely related on the one hand to that of the hexagonal ferrites and on the other hand to that of β-alumina and β''-alumina. The luminescent materials according to the invention are ternary compounds whose composition can be represented in a ternary phase diagram having angular points A, B and C. In this case A is the oxide comprising the large positive ion. It has been found that for A one or more of the oxides $\frac{1}{2}Na_2O$, $\frac{1}{2}K_2O$, $\frac{1}{2}Rb_2O$, $\frac{1}{2}Cs_2O$, CaO, SrO, BaO, $\frac{1}{2}La_2O_3$, $\frac{1}{2}Ce_2O_3$, $\frac{1}{2}Tb_2O_3$, $\frac{1}{2}Dy_2O_3$, $\frac{1}{2}Bi_2O_3$, EuO, PhO, $\frac{1}{2}Tl_2O$ and $\frac{1}{2}In_2O$ can be chosen. C is the oxide which comprises the small bivalent ion. For C one or more of the oxides MgO, ZnO, BeO, $\frac{1}{2}LiAlO_2$ and $\frac{1}{2}LiGaO_2$ can be chosen. $Al_2O_3$ and/or $Ga_2O_3$ is denoted by B. The expression "ternary compound" is understood to mean that the compound comprises at least one oxide from each of the said groups A, B and C. A compound comprising more than one oxide from one or more of the groups A, B and C is furthermore considered to be likewise ternary in this description and claims.

The compounds having the said hexagonal crystal structure are found in the phase diagram in the region bounded by the conditions $0<[A]<[B]$ and $0<[C]<0.6$. In these inequalities [A], [B] and [C] represent the contents or molar fractions of the oxides A, B and C, respectively, $([A]+[B]+[C]=1)$.

It was found that the new compounds can be activated by one or more of the elements manganese, europium, lead, thallium, cerium, indium, terbium, dysprosium and bismuth, while obtaining efficient luminescent materials. The activators Eu, Pb, Tl, Ce, In, Tb, Dy and Bi form part of the oxide A. The concentration of the latter activators may be so large that the oxide A completely consists of activator oxide. Consequently, for example, the material $CeMgAl_{11}O_{19}$ will hereinafter be considered as a cerium-activated compound. The manganese concentration is not more than 10 at.% calculated with respect to the total number of metal atoms of the oxides B and C. It is assumed that manganese completely or partly replaces the metal of the oxide C and that also a part of the metal atoms of the oxide B is replaced if the manganese concentration is larger than the quantity of metal atoms of the oxide C available for replacement. The activator concentration is at least so large that the material is luminescent. In many cases an efficient luminescence already occurs if 0.01 at.% of the metal of the oxide C is replaced by manganese and/or if 0.1 mol.% of the oxide A consists of oxide of one or more of the other activator elements.

FIG. 1 of the drawing shows the ternary phase diagram ABC. In this diagram which has the shape of a triangle with corners A, B and C all compounds built up from the oxides A B and C can be represented by a point. The binary compounds are found in the diagram on the sides AB,BC and AC. The ternary compounds are located within the triangle ABC. It is to be noted that a point on or inside triangle ABC uniformly represents a given compound as regards the content of oxides A, B and C. It is of course not determined which oxide (or which oxides) from the groups A, B and C is (are) present in the compound. Various compounds are denoted by characters in FIG. 1 while the compounds having a composition corresponding to those of the known ferrites are denoted by the same character by which these ferrites are known. The compounds have a cubic structure and a composition analogous to the ferrites having the spinel structure are denoted by S. The compounds having a composition analogous to the magnetoplumbite are found at point M. Furthermore the compounds analogous to the known ternary ferrites Y, W, X and Z are shown. Finally the points β and β'' on the side AB show the composition of the compounds β and β''-alumina, respectively, and the gallates analogous thereto.

It has been found that the luminescent compounds according to the invention in the phase diagram ABC cover a larger region than the region which is determined by combinations of the compounds Y, M and S (all of which are located on and inside the triangle YMS). Compositions have also been found outside the triangle YMS which have a hexagonal crystal structure analogous to that of the hexagonal ferrites, to β-alumina or to β''-alumina. This is shown by the above-mentioned conditions to be satisfied by the contents of the oxides A, B and C. These conditions lead to the region given in FIG. 1 for the materials according to the invention: the region within the square RBPQ with the exception of the compounds whose composition is represented by points on the sides of this square.

In addition to the above-described conditions which are imposed on the composition of the luminescent materials according to the invention there further applies, as already stated, that these materials must have a hexagonal crystal structure which is related to that of the hexagonal ferrites or to $\beta$ or $\beta''$-alumina. The crystal structure of a compound having a composition within the square RBPQ can be determined with the aid of known X-ray diffraction techniques. For the materials according to the invention powder diagrams are obtained which may be indicated by the formula $$\frac{1}{d^2} = \frac{4}{3a^2}(h^2 + hk + k^2) + \frac{b^2}{c^2}$$

which formula is characteristic of the hexagonal crystal structures. A crystallographic a-axis which has approximately the same value, namely 5.85-5.90 Å for all hexagonal ferrites is calculated from the powder diagrams of the known hexagonal ferrites (which can be indicated by the same formula). The crystallographic c-axis of the hexagonal ferrites varies, however, within very wide limits dependent on the composition of the ferrite (for example 23.03 Å for the compound $SrFe_{12}O_{19}$ and 637 Å for the compound $Ba_{28}Zn_{26}Fe_{180}O_{324}$). All hexagonal gallates according to the invention have an a-axis which does not deviate much from that of the ferrites, namely 5.80-5.85 Å. For the hexagonal aluminates according to the invention a lower value of the a-axis is always found, namely 5.55-5.65 Å. For the a-axis of the aluminate gallates according to the invention a value of between 5.55 and 5.85 Å is found. The crystallographic c-axis of the new aluminates, gallates and aluminate gallates according to the invention cannot be uniformly determined in all cases from the powder diagrams but has a value which is dependent on the composition of the compound and is located in the same very wide range as the values of the c-axis of the hexagonal ferrites.

It is to be noted that it is possible to prepare a material whose X-ray diagram shows that a hexagonal compound is obtained while starting from a mixture of oxides corresponding to a point located outside the square RBPQ in the phase diagram. In such a case this hexagonal compound is, however, always impurified with an unwanted large quantity of side phases and the hexagonal compound itself obtained has a composition corresponding to a point within the square RBPQ.

The formulas of a number of compounds (all chosen examples relate to aluminates) which may constitute the fundamental lattice for luminescent materials according to the invention will now be given as a further reference and exclusively by way of example. It has been shown by way of X-ray analyses for all of these examples that they have the hexagonal crystal structure.

Examples of compounds which are represented by a point on the line MY in the phase diagram of FIG. 1:

| | |
|---|---|
| $Sr_2Mg_2Al_{12}O_{22}$ | (point Y in FIG. 1) |
| $Ba_3Mg_2Al_{24}O_{41}$ | (point Z in FIG. 1) |
| $Sr_4Mg_2Al_{36}O_{60}$ | |
| $Ba_8Mg_6Al_{60}O_{104}$ | |
| $Sr_{10}Mg_8Al_{72}O_{126}$ | |
| $Ba_{12}Mg_{10}Al_{84}O_{148}$ | |
| $Sr_{14}Mg_{12}Al_{96}O_{170}$ | |

-continued $Sr_{28}Mg_{26}Al_{180}O_{324}$.

Examples of compounds which are represented by a point on the line MS in the phase diagram of FIG. 1:

| | |
|---|---|
| $BaMg_2Al_{16}O_{27}$ | (point W in FIG. 1) |
| $BaBe_2Al_{16}O_{27}$ | (point W in FIG. 1) |
| $BaMg_2Al_{12}Sc_4O_{27}$ | (point W in FIG. 1) |
| $Sr_2Mg_2Al_{28}O_{46}$ | (point X in FIG. 1) |
| $BaMg_4Al_{20}O_{35}$ | |
| $BaMg_6Al_{24}O_{43}$ | |
| $BaMg_8Al_{28}O_{51}$ | |
| $Ba_3Mg_2Al_{40}O_{65}$ | |
| $Ba_4Mg_2Al_{52}O_{84}$ | |
| $Ba_5Mg_2Al_{64}O_{103}$. | |

Examples of compounds which are represented by a point in the line SY in the phase diagram of FIG. 1:

| | |
|---|---|
| $Ba_2Mg_4Al_{16}O_{30}$ | |
| $Ba_2Li_2Al_{18}O_{30}$ | (composition to be written as: $2BaO.4(\frac{1}{2}LiAlO_2).8Al_2O_3$) |
| $Ba_2Mg_6Al_{20}O_{38}$ | |
| $Ba_2Mg_8Al_{24}O_{46}$ | |
| $Ba_2Mg_{10}Al_{28}O_{54}$ | |
| $Ba_2Mg_{12}Al_{32}O_{62}$ | |
| $Ba_2Mg_{22}Al_{52}O_{102}$. | |

Examples of compounds which are represented by a point within the triangle YSM in the phase diagram of FIG. 1:

| | |
|---|---|
| $LaMgAl_{11}O_{19}$ | (composition to be written as: $2(\frac{1}{2}La_2O_3).2MgO.11Al_2O_3$) |
| $NaMg_2Al_{15}O_{25}$ | (composition to be written as: $2(\frac{1}{2}Na_2O).4MgO.15Al_2O_3$). |
| $Ba_3Mg_5Al_{30}O_{53}$ | |
| $Ba_2Zn_5Al_{32}O_{55}$ | |
| $Sr_4Zn_4Al_{40}O_{68}$ | |
| $Ba_3Mg_{10}Al_{40}O_{73}$ | |
| $Sr_{5.5}Mg_6Al_{55}O_{94}$ | |
| $Ca_5Mg_4Al_{62}O_{102}$. | |

Examples of compounds which are represented by a point outside the triangle YSM in the phase diagram of FIG. 1:

| | |
|---|---|
| $Na_2MgAl_{10}O_{17}$ | (composition to be written as: $2(\frac{1}{2}Na_2O).MgO.5Al_2O_3$) |
| $Ba_2Mg_4Al_{10}O_{21}$ | |
| $Ba_2Mg_7Al_{14}O_{30}$ | |
| $Ba_2Zn_2Al_{32}O_{52}$ | |
| $Ba_2Mg_{14}Al_{30}O_{61}$ | |
| $BaMg_6Al_{36}O_{61}$ | |
| $Sr_8Zn_4Al_{48}O_{84}$ | |
| $Ba_6Mg_6Al_{136}O_{216}$ | |
| $Ba_2Mg_2Al_6O_{13}$ | |
| $Ba_2Mg_3Al_6O_{14}$ | |
| $Ba_4Mg_2Al_{14}O_{27}$ | |
| $Ba_7Mg_2Al_{22}O_{42}$. | |

In a luminescent screen according to the invention a luminescent material according to the invention is preferably used whose content of oxide B is more than 0.9 times the content of oxide C and whose content of oxide B is more than 1.85 times the content of oxide A. All these materials have compositions which are represented by points within the square FBDE in the phase diagram of FIG. 1 and have very satisfactory luminescence properties upon suitable excitation.

Optimum luminescence properties are obtained with materials according to the invention whose composition in the phase diagram is represented by points on or inside the triangle constituted by the compounds C.B, 2A.2C.6B and A.6B. Of this group of luminescent materials, which is preferred, the materials C.B and A.6B are excepted because they are no ternary compounds. In the phase diagram of FIG. 1 this group of materials is found on and inside the triangle YSM (except for the compounds S and M).

Luminescent materials according to the invention which comprise magnesium oxide as the oxide C are preferred because the largest luminous fluxes and the highest brightnesses can be obtained with these materials.

A very advantageous group of luminescent materials according to the invention is constituted by the compounds in which the oxide B consists completely or for the greater part (i.e. at least for 75 mol.%) of $Al_2O_3$ and particularly those compounds (hereinafter denoted as aluminates) which are activated by one or more of the elements Eu, Ce, Tl, Pb, In and Tb. These aluminates are very efficient luminescent materials which can be very satisfactorily excited by both short-wave and long-wave ultraviolet radiation. They have the characteristic emission of the element used as an activator. These aluminates are suitable for many uses. It is to be noted that the said aluminates may alternatively be excited by cathode rays and X-rays.

The cerium-activated aluminates according to the invention have an emission in the ultraviolet. The location of the maximum of the spectral distribution of the emitted radiation is dependent on the fundamental lattice used and furthermore on the cerium content. This maximum is found at wavelengths between approximately 300 and 360 nm. The half value width of the emission band is 30-55 nm. The cerium-activated aluminates may be advantageously used in discharge lamps, particularly low-pressure mercury vapour discharge lamps for photochemical uses, for example, for photocopy purposes. Two examples are given below of cerium-activated aluminates according to the invention. In addition to the formula the results of some measurements are mentioned for each compound. The luminous flux upon excitation by short-wave ultraviolet radiation (predominently 254 nm) is shown under LO in % relative to a standard (a luminescent calcium halophosphate activated by antimony and manganese and mixed with non-luminescent calcium carbonate in such a quantity that the luminous flux of the halophosphate has decreased to approximately 50% is used as a standard). The absorption of the exciting radiation is mentioned under A in % relative to the UV absorption of zinc oxide. $\lambda_{max}$ shows the location of the maximum of the emission spectrum (nm) and hwb shows the half value width of the emission band (nm).

| Example | LO in % | A in % (254 nm) | $\lambda_{max}$ in nm | hwb in nm |
|---|---|---|---|---|
| 1. $CeMgAl_{11}O_{19}$ | 77 | 96 | 357 | 56 |
| 2. $Ca_3Ce_2Mg_4Al_{62}O_{103}$ | 13 | 62 | 335 | 55 |

Unless otherwise stated the measurements of LO, A, $\lambda_{max}$ and hwb of the examples shown in the Tables below are performed in the same manner as described above for the cerium-activated aluminates.

The cerium-activated aluminates having a relatively short-wave emission ($\lambda_{max}$ between 300 and 320 nm) may be advantageously used in low-pressure mercury vapour discharge lamps for generating erythermal radiation. They may also be used for the same purpose in high-pressure mercury vapour discharge lamps, converting the short-wave ultraviolet radiation (predominantly 254 nm) into erythermal radiation (300-320 nm). A great advantage then is that these aluminates have a very satisfactory temperature dependence of the luminous flux. At 500° C. said luminous flux may be equal to or even be higher than the luminous flux at room temperature. Examples of such aluminates are given in the table below (Example 2a-2f). The quantum efficiency (QR in %) is in this case mentioned instead of the luminous flux. Upon further optimization of the preparation of the material according to example 2c a quantum efficiency of 70% is reacted. It is noted that the known thallium-activated calcium orthophosphate (NBS standard 1033, $\lambda_{max}$ approximately 307 nm) has a quantum efficiency of 56%.

| Example | QR in % | A in % (254 nm) | $\lambda_{max}$ in nm | hwb in nm |
|---|---|---|---|---|
| 2a. $Ca_{0.95}Ce_{0.05}Mg_{0.05}Al_{11.95}O_{19}$ | 48 | 85 | 318 | 50 |
| 2b. $Sr_{0.99}Ce_{0.01}Mg_{0.01}Al_{11.99}O_{19}$ | 28 | 52 | 300 | 40 |
| 2c. $Sr_{0.95}Ce_{0.05}Mg_{0.05}Al_{11.95}O_{19}$ | 52 | 71 | 303 | 40 |
| 2d. $Sr_{0.9}Ce_{0.1}Mg_{0.1}Al_{11.9}O_{19}$ | 47 | 73 | 303 | 45 |
| 2e. $Sr_{0.85}Ce_{0.15}Mg_{0.15}Al_{11.85}O_{19}$ | 51 | 87 | 307 | 50 |
| 2f. $Sr_{0.8}Ce_{0.2}Mg_{0.2}Al_{11.8}O_{19}$ | 42 | 84 | 310 | 45 |

The thallium-activated aluminates according to the invention have a spectral distribution of the emitted radiation which is dependent on the method used for the manufacture of these aluminates. If a relatively large quantity of activator is used for this manufacture (for example, heating in air of the fundamental lattice compound mixed with 1 mol $Tl_2SO_4$ per mol of the fundamental lattice) a luminescent aluminate is obtained which upon excitation by ultraviolet radiation (254 nm) has a broad-band emission (half value width 100 to 125 nm) with a maximum at 465-480 nm. These aluminates, mixed with other luminescent materials may be used in low-pressure mercury vapour discharge lamps for general illumination purposes in order to obtain a desired colour correction of the light emitted by the lamp. If the heat treatment is carried out for a comparatively long time during manufacture or when a smaller quantity of the activator is used (for example, 0.1-0.5 mol $Tl_2SO_4$ per mol of the fundamental lattice) thallium-activated aluminates are obtained which have a narrow-band emission in the ultraviolet part of the spectrum with a maximum at approximately 295 nm and a half value width of approximately 27 nm together with a broader bound at approximately 412 nm. In addition to heating in air these aluminates may alternatively be manufactured by heating in a shielding atmosphere. The thallium-activated aluminates having an emission at 295 nm may be used, for example, in low-pressure mercury vapour discharge lamps for irradiation purposes (generation of erythema of the skin).

| Example | LO in % | A in % (254 nm) | $\lambda_{max}$ in nm | hwb in nm |
|---|---|---|---|---|
| 3. $(Ba,Tl)Mg_2Al_{16}O_{27}$ | 165 | 94 | 477 | 109 |
| 4. $(Ba,Tl)Mg_2Al_{16}O_{27}$ | 111 | 78 | 412 and 295 | 116 and 25 |

In the formulas of the compounds according to Example 3 and 4 it has not been stated which quantity of Ba is replaced by Tl. The compound 3 is obtained by heating in air 1 mol $BaMg_2Al_{16}O_{27}$ mixed with 1 mol $Tl_2SO_4$ for one hour at 1050° C. The $BaMg_2Al_{16}O_{27}$ used as a starting material is manufactured by firing in air of a mixture of starting materials at 1400° C. The compound 4 is obtained by heating in a nitrogen stream 1 mol $BaMg_2Al_{16}O_{27}$ mixed with ½ mol $Tl_2SO_4$ for ½ hour at 1000° C., which nitrogen stream is passed through water of room temperature. The quantity of thallium used is not completely taken up in the fundamental lattice. The excess of the thallium compound is removed by washing with water from the product obtained.

The lead-activated aluminates according to the invention have an emission upon excitation by ultraviolet radiation with a spectral distribution having a maximum at 395–400 nm and a half value width of approximately 80 nm. These aluminates may be used in discharge lamps, particularly low-pressure mercury vapour discharge lamps for photochemical processes, for example, for reproduction purposes.

| Example | LO in % | A in % (254 nm) | $\lambda_{max}$ in nm | hwb nm |
|---|---|---|---|---|
| 5. $Ba_{7.6}Pb_{0.4}Mg_6Al_{60}O_{104}$ | 41 | 54 | 395 | 80 |
| 6. $Ba_7PbMg_6Al_{60}O_{104}$ | 46 | 68 | 395 | 80 |

The indium-activated aluminates according to the invention have an emission upon excitation by ultraviolet radiation with a spectral distribution whose maximum is located at a wavelength of approximately 400 nm and whose half value width is approximately 45 nm. These aluminates according to the invention may be used for the same purposed as the above-mentioned lead-activated aluminates.

| Example | LO in % | A in % (254 nm) | $\lambda_{max}$ in nm | hwb in nm |
|---|---|---|---|---|
| 7. $(Ba,In)Mg_2Al_{16}O_{27}$ | 78 | 52 | 402 | 48 |

The terbium-activated aluminated according to the invention have the characteristic terbium emission upon excitation by ultraviolet radiation. The spectral distribution of the radiation emitted by these aluminates consists of a number of sharp peaks the highest of which is located at approximately 544 nm and has a half value width of approximately 10 nm.

The compounds in which at least the greater part of the oxide B consists of $Al_2O_3$ yield very efficient luminescent materials upon activation by europium which are suitable for a number of important uses. Therefore these europium-activated aluminates according to the invention are preferred. The spectral distribution of the europium-activated aluminates have a maximum which dependent on the fundamental lattice used is located in the range of approximately 450 to 515 nm. The half value width of the emission band generally has a larger value as the maximum emission is located at longer wavelengths and ranges from approximately 45 to 105 nm. These aluminates have the great advantage that they have a very broad excitation spectrum so that they may not only eminently be used in low-pressure mercury vapour discharge lamps (excitation predominantly by radiation at a wavelength of approximately 254 nm), but also in high-pressure mercury vapour discharge lamps (excitation predominantly by radiation at a wavelength of 365 nm) and in low-pressure cadmium vapour discharge lamps (excitation in the range of 230–330 nm).

In low-pressure mercury vapour discharge lamps for general illumination purposes the europium-activated aluminates, combined with other luminescent materials may be used to correct the colour of the radiation emitted by these lamps. Colour correction of these types of lamps by extra radiation in the blue and blue-green spectral ranges between 450 and 515 nm is desirable in many cases. A special advantage of the invention is that a large number of luminescent aluminates having a different location of the maximum of the spectral distribution of the emitted radiation within the said spectral range is available. The maximum emission of the correcting radiation can be adapted to the requirement imposed for a given use by suitable choice of the aluminate fundamental lattice. The europium-activated aluminates having a maximum emission on the short-wave side of the spectrum ($\lambda_{max}$ from 450 to 470 nm) are the most important for this use.

The europium-activated aluminates according to the invention may furthermore be used very advantageously in high-pressure mercury vapour discharge lamps and in low-pressure cadmium vapour discharge lamps likewise for obtaining colour correction of the radiation emitted by these lamps. They have of course the same advantage of the wide possibility of choosing the location of the maximum of the spectral distribution of the correcting radiation. It is very advantageous for these uses that these aluminates have a very favourable temperature dependence of the luminous flux in many cases because the luminescent material must be active at higher temperature for these uses. For some aluminates according to the invention a reduction of the luminous flux to 50% of the value at room temperature is found only at approximately 500° C.

The europium-activated aluminates according to the invention are very advantageously used in low-pressure mercury vapour discharge lamps for influencing photochemical processes. For some chemical reactions radiation in the wavelength range of between 450 and 515 nm is often desirable or even necessary so as to cause the rection to proceed at a sufficient rate. Particularly the europium-activated aluminates which have their maximum emission at approximately 450 nm are found to be very efficient due to their high luminous flux and favourable spectral distribution in low-pressure mercury vapour discharge lamps for treating hyperbilirubinemia (a kind of jaundice often found in newborn babies).

The following Table shows a number of examples of europium-activated aluminates according to the invention. Each example is followed by the formula and the result of the measurement of the luminous flux (LO in % with respect to the above-mentioned standard), absorption of the exciting radiation (A in %), location of the maximum of the emission spectrum ($\lambda_{max}$ in nm) and half value width of the emission band (hwb in nm).

All measurements were performed upon excitation by short wave ultraviolet radiation (predominantly 254 nm).

| Example | LO in % | A in % (254 nm) | $\lambda_{max}$ in nm | hwb in nm |
|---|---|---|---|---|
| 8. $Ba_{0.9}Eu_{0.1}Mg_2Al_{16}O_{27}$ | 231 | 80 | 452 | 51 |
| 9. $Sr_{0.45}Ba_{0.45}Eu_{0.1}Mg_2Al_{16}O_{27}$ | 191 | 75 | 456 | 60 |
| 10. $Ba_{0.9}Eu_{0.1}Mg_2Al_{14.4}Cs_{1.6}O_{27}$ | 201 | 60 | 451 | 50 |
| 11. $Ba_{7.5}Eu_{0.5}Mg_6Al_{60}O_{104}$ | 86 | 64 | 455 | 75 |
| 12. $Ba_{7.25}Eu_{0.75}Mg_6Al_{60}O_{104}$ | 133 | 67 | 455 | 50 |
| 13. $Ba_7EuMg_6Al_{60}O_{104}$ | 129 | 68 | 455 | 48 |
| 14. $Ba_6Eu_2Mg_6Al_{60}O_{104}$ | 126 | 70 | 454 | 47 |
| 15. $Sr_{7.5}Eu_{0.5}Mg_6Al_{60}O_{104}$ | 214 | 69 | 472 | 87 |
| 15a. $Sr_5Eu_{0.5}Mg_6Al_{55}O_{94}$ | 280 | 92 | 465 | 62 |
| 16. $Sr_{7.25}Eu_{0.75}Mg_6Al_{60}O_{104}$ | 223 | 78 | 472 | 87 |
| 17. $Sr_7EuMg_6Al_{60}O_{104}$ | 231 | 85 | 475 | 87 |
| 18. $Sr_6Eu_2Mg_6Al_{60}O_{104}$ | 201 | 84 | 472 | 79 |
| 19. $Sr_{3.6}Ba_{3.6}Eu_{0.8}Mg_6Al_{60}O_{104}$ | 232 | 88 | 456 | 52 |
| 20. $Sr_{1.99}Eu_{0.01}Mg_2Al_{12}O_{22}$ | 91 | 44 | 510 | 102 |
| 21. $Sr_{1.97}Eu_{0.03}Mg_2Al_{12}O_{22}$ | 147 | 63 | 512 | 101 |
| 22. $Sr_{1.95}Eu_{0.05}Mg_2Al_{12}O_{22}$ | 179 | 71 | 512 | 100 |
| 23. $Sr_{1.90}Eu_{0.10}Mg_2Al_{12}O_{22}$ | 193 | 78 | 511 | 98 |
| 24. $Sr_{1.85}Eu_{0.15}Mg_2Al_{12}O_{22}$ | 193 | 84 | 508 | 100 |
| 25. $Sr_{1.75}Eu_{0.25}Mg_2Al_{12}O_{22}$ | 193 | 87 | 508 | 100 |
| 26. $Sr_{2.7}Eu_{0.3}Mg_2Al_{24}O_{41}$ | 170 | 92 | 467 | 68 |
| 27. $Sr_{3.6}Eu_{0.4}Mg_2Al_{36}O_{60}$ | 74 | 90 | 463 | 65 |
| 28. $Sr_9EuMg_8Al_{72}O_{126}$ | 189 | 91 | 466 | 66 |
| 29. $Sr_{10.8}Eu_{1.2}Mg_{10}Al_{84}O_{148}$ | 181 | 88 | 467 | 64 |
| 30. $Sr_{12.6}Eu_{1.4}Mg_{12}Al_{96}O_{170}$ | 176 | 88 | 468 | 65 |
| 31. $Ba_{1.6}Eu_{0.4}Mg_4Al_{16}O_{30}$ | 114 | 73 | 452 | 54 |
| 32. $Ba_{1.6}Eu_{0.4}Li_2Al_{18}O_{30}$ | 108 | 79 | 455 | 55 |
| 33. $Ba_{0.8}Eu_{0.2}ZnAl_{10}O_{17}$ | 193 | 79 | 453 | 50 |
| 34. $Sr_{0.8}Eu_{0.2}ZnAl_{10}O_{17}$ | 196 | 76 | 469 | 65 |
| 35. $Ba_{2.4}Eu_{0.6}Mg_5Al_{30}O_{53}$ | 211 | 81 | 450 | 50 |
| 36. $Ba_{1.6}Eu_{0.4}Zn_5Al_{32}O_{55}$ | 176 | 70 | 452 | 50 |
| 37. $Ba_{2.4}Eu_{0.6}Mg_{10}Al_{40}O_{73}$ | 186 | 70 | 450 | 52 |
| 38. $K_{0.8}Eu_{0.2}Mg_{2.2}Al_{14.8}O_{25}$ | 213 | 68 | 458 | 57 |
| 39. $Rb_{0.8}Eu_{0.2}Mg_{2.2}Al_{14.8}O_{25}$ | 201 | 66 | 450 | 50 |
| 40. $Na_{0.8}Eu_{0.2}Mg_{2.2}Al_{14.8}O_{25}$ | 150 | 64 | 500 | 97 |
| 41. $Cs_{0.8}Eu_{0.2}Mg_{2.2}Al_{14.8}O_{25}$ | 24 | 36 | 458 | 50 |
| 42. $Na_{1.8}Eu_{0.2}Mg_{1.2}Al_{9.8}O_{17}$ | 76 | 70 | 510 | 100 |
| 43. $Sr_{1.5}Eu_{0.5}ZnAl_{12}O_{21}$ | 155 | 83 | 472 | 90 |
| 44. $Ba_{0.8}Eu_{0.2}Mg_6Al_{36}O_{61}$ | 150 | 62 | 452 | 52 |
| 45. $Sr_7EuZn_5Al_{60}O_{103}$ | 192 | 77 | 472 | 85 |
| 46. $Ba_{4.8}Eu_{1.2}Mg_6Al_{136}O_{216}$ | 199 | 83 | 452 | 52 |
| 47. $Ba_{1.6}Eu_{0.4}Mg_4Al_{10}O_{21}$ | 39 | 69 | 500 | 68 |
| 48. $Ba_{1.6}Eu_{0.4}Mg_2Al_6O_{13}$ | 65 | 84 | 500 | 68 |
| 49. $Ba_{3.2}Eu_{0.8}Mg_2Al_{14}O_{27}$ | 63 | 82 | 500 | 72 |
| 50. $Ba_{5.6}Eu_{1.4}Mg_2Al_{22}O_{42}$ | 60 | 90 | 505 | 72 |

The above-given Table clearly shows that the invention provides a large number of europium-activated aluminates whose maximum emission, dependent on the fundamental lattice is located at a wavelength of between approximately 450 and 515 nm and all of which yield very high luminous fluxes. Compare, for example, the materials according to Examples 39, 8, 19, 38, 28, 16, 17, 40, 24 and 23. The group of materials according to Examples 8-10 and further analogous compounds constitute very efficient luminescent aluminates which in addition exhibit a very favourable temperature dependence of the luminous flux. The material according to Example 8 has a quantum efficiency of 92% upon excitation by short-wave ultraviolet radiation. The temperature at which the luminous flux has decreased to 50% of the value at room temperature ($T_{50}$) is 495° C. for this material. Very efficient luminescent aluminates are furthermore found in the group according to Examples 11-19. The quantum efficiency of the material according to Example 15a is approximately 99%. The quantum efficiency of the material according to Example 16 is approximately 85% and $T_{50}$ is found to be approximately 300° C.

A special group of luminescent aluminates according to the invention (at least 75 mol.% of the oxide B is $Al_2O_3$) is constituted by the aluminates which are activated at least by one of the elements europium, cerium, thallium and indium and furthermore by the element manganese. In these materials the former activator elements operate as so-called sensitizers for the manganese emission, that is to say, the exciting energy is transferred by the sensitizer either completely or partly to the manganese activator. Examples of manganese-activated aluminates sensitized by cerium, thallium or indium follow below.

| Example | LO in % | A in % (254 nm) | $\lambda_{max}$ in nm | hwb in nm |
|---|---|---|---|---|
| 51. $CeMg_{0.75}Mn_{0.25}Al_{11}O_{19}$ | 60 | 95 | 350 | — |
|  |  |  | 518 |  |
| 52. $(Ba,Tl)Mg_{1.9}Mn_{0.1}Al_{16}O_{27}$ | 95 | 66 | 295 | 26 |
|  |  |  | 390 | 58 |
|  |  |  | 512 | 28 |
| 53. $(Ba,In)Mg_{1.9}Mn_{0.1}Al_{16}O_{27}$ | 118 | 74 | 400 | 48 |
|  |  |  | 515 | 25 |

The measurements on the materials according to the above-mentioned examples show that in these cases the energy transfer to manganese is only effected partly and that a contribution to the emission originating from the sensitizer ion is always found. This may be advantageous in those cases where more emission bands are desirable. In order to obtain an efficient manganese emission the said energy transfer is, however, to be as complete as possible. A complete transfer is possible, if europium is used as a sensitizer. Luminescent aluminates are then obtained which have very high quantum efficiencies and very high luminous fluxed upon excitation by ultraviolet radiation.

The europium and manganese-activated aluminates according to the invention constitute a very advantageous group of luminescent materials. Likewise as the aluminates only activated by europium according to the invention they have the advantages of a broad excitation spectrum and a favourable, in some cases very favourable temperature dependence of the luminous flux. They can therefore be used not only in low-pressure mercury vapour discharge lamps, but for example also in low-pressure cadmium vapour discharge lamps and in high-pressure mercury vapour discharge lamps. The europium and manganese-activated aluminates have the special advantage that they can emit both the green manganese emission and the blue europium emission. The ratio between the manganese and europium contributions in the emission can be regulated substantially steplessly by variation of the ratio between the manganese and europium concentrations. If the manganese concentration is several times higher than the europium concentration, the energy transfer is substantially complete so that only the manganese emission is obtained. Likewise as for the aluminates only activated by europium it is possible to adapt the location of the europium emission in the spectrum within certain limits to the requirement imposed for a given use by suitable choice of the aluminate fundamental lattice. In view of the above-mentioned properties the europium and manganese-activated aluminates constitute a very flexible system of very efficient luminescent materials which can be used very advantageously together with other luminescent materials in low-pressure mercury vapour, low-pressure cadmium vapour and high-pressure mercury vapour discharge lamps in order to realize a colour correction of the radiation emitted by these lamps. Correction is possible either in the green region only or both in the green and in the green-blue region of the spectrum.

The europium and manganese-activated aluminates according to the invention, particularly those aluminates for which the energy transfer from europium to manganese is effected substantially completely are very advantageously used in low-pressure mercury vapour-discharge lamps for use in electrophotographic reproduction processes, e.g. in xerography. For this purpose an efficient luminescent material which emits in a narrow band in the green part of the spectrum must be available. As compared with the manganese-activated magnesium gallates (in which part of gallium may be replaced by aluminium) having the spinel structure (see the quoted U.S. Pat. No. 3,407,325 and Netherlands Patent application No. 6,702,017) which gallates have hitherto been used frequently in xerography, the aluminates according to the invention have the advantage of a considerably higher quantity efficiency and a higher luminous flux. Another advantage is that the aluminates according to the invention have an emission which as compared with the known gallates is slightly shifted to red, ($\lambda_{max}$ at 515 instead of 510 nm) so that the reproduction of the important blue colours can be improved. A great advantage is that the aluminates according to the invention are considerably cheaper than the known gallates because aluminium is less expensive than gallium.

The following Table shows a number of examples of europium and manganese-activated aluminates according to the invention. Each example is followed in the same manner as in the other Tables by the measurements of LO, A, $\lambda_{max}$ and hwb.

| Example | LO in % | A in % (254 nm) | $\lambda_{max}$ in nm | hwb in nm |
|---|---|---|---|---|
| 54. $Ba_{0.9}Eu_{0.1}Mg_{1.8}Mn_{0.2}Al_{16}O_{27}$ | 235 | 80 | 452, 514 | —, 26[1] |
| 55. $Sr_{0.45}Ba_{0.45}Eu_{0.1}Mg_{1.8}Mn_{0.2}Al_{16}O_{27}$ | 212 | 78 | 458, 514 | —, 28[1] |
| 56. $Ba_{0.9}Eu_{0.1}Mg_{1.7}Mn_{0.3}Al_{16}O_{27}$ | 247 | 79 | 451, 514 | —, 25[1] |
| 57. $Ba_{0.9}Eu_{0.1}Mg_{1.6}Mn_{0.4}Al_{16}O_{27}$ | 232 | 79 | 452, 514 | —, 25[1] |
| 58. $Ba_{0.8}Eu_{0.2}Mg_{1.6}Mn_{0.4}Al_{16}O_{27}$ | 250 | 85 | 455, 514 | —, 25[1] |
| 59. $Ba_{0.8}Eu_{0.2}Mg_{1.4}Mn_{0.6}Al_{16}O_{27}$ | 249 | 86 | 515 | 27 |
| 60. $Ba_{0.8}Eu_{0.2}Mg_{1.4}Mn_{0.6}Al_{12}Ga_4O_{27}$ | 124 | 77 | 515 | 30 |
| 61. $Ba_{0.8}Eu_{0.2}Mg_{1.2}Mn_{0.8}Al_{16}O_{27}$ | 238 | 87 | 515 | 27 |
| 62. $Ba_{0.7}Eu_{0.3}Mg_{1.6}Mn_{0.4}Al_{16}O_{27}$ | 191 | 87 | 455, 514 | —, 26[1] |
| 63. $Ba_{0.7}Eu_{0.3}Mg_{1.4}Mn_{0.6}Al_{16}O_{27}$ | 193 | 87 | 515 | 27 |
| 64. $Ba_{0.7}Eu_{0.3}Mg_{1.1}Mn_{0.9}Al_{16}O_{27}$ | 172 | 90 | 515 | 27 |
| 65. $Sr_{7.75}Eu_{0.25}Mg_{5.25}Mn_{0.75}Al_{60}O_{104}$ | 190 | 76 | 515 | 27 |
| 66. $Sr_{7.75}Eu_{0.25}Mg_5MnAl_{60}O_{104}$ | 191 | 80 | 515 | 27 |
| 67. $Sr_{7.75}Eu_{0.25}Mg_{4.75}Mn_{1.25}Al_{60}O_{104}$ | 186 | 80 | 516 | 27 |
| 68. $Sr_{7.75}Eu_{0.25}Mg_{4.5}Mn_{1.5}Al_{60}O_{104}$ | 179 | 81 | 515 | 27 |
| 69. $Sr_{7.5}Eu_{0.5}Mg_5MnAl_{60}O_{104}$ | 214 | 86 | 515 | 27 |
| 70. $Sr_{7.5}Eu_{0.5}Mg_{4.5}Mn_{1.5}Al_{60}O_{104}$ | 206 | 87 | 515 | 27 |
| 71. $Sr_{7.5}Eu_{0.5}Mg_4Mn_2Al_{60}O_{104}$ | 200 | 88 | 515 | 27 |
| 72. $Sr_{7.5}Eu_{0.5}Mg_{3.5}Mn_{2.5}Al_{60}O_{104}$ | 177 | 89 | 516 | 27 |
| 73. $Sr_{7.4}Eu_{0.6}Mg_{5.55}Mn_{0.45}Al_{60}O_{104}$ | 220 | 89 | 465, 514 | —, 27[1] |
| 74. $Sr_{7.25}Eu_{0.75}Mg_{4.5}Mn_{1.5}Al_{60}O_{104}$ | 216 | 90 | 516 | 27 |
| 75. $Sr_{3.6}Ba_{3.6}Eu_{0.8}Mg_{5.6}Mn_{0.4}Al_{60}O_{104}$ | 219 | 89 | 455, 515 | 55, 27 |
| 76. $Sr_7EuMg_4Mn_2Al_{60}O_{104}$ | 218 | 93 | 516 | 27 |
| 77. $Sr_7EuMg_3Mn_3Al_{60}O_{104}$ | 120 | 95 | 516 | 27 |
| 78. $Sr_{1.85}Eu_{0.15}Mg_{1.92}Mn_{0.08}Al_{12}O_{22}$ | 216 | 82 | 516 | 60[2] |
| 79. $Sr_{1.75}Eu_{0.25}Mg_{1.75}Mn_{0.25}Al_{12}O_{22}$ | 205 | 88 | 517 | 35 |
| 80. $Sr_{1.65}Eu_{0.35}Mg_{1.75}Mn_{0.25}Al_{12}O_{22}$ | 206 | 91 | 517 | 34 |
| 81. $Sr_{1.50}Eu_{0.50}Mg_{1.75}Mn_{0.25}Al_{12}O_{22}$ | 208 | 93 | 517 | 33 |
| 82. $Sr_{1.25}Eu_{0.75}Mg_{1.75}Mn_{0.25}Al_{12}O_{22}$ | 175 | 96 | 518 | 30 |
| 83. $SrEuMg_{1.75}Mn_{0.25}Al_{12}O_{22}$ | 171 | 95 | 518 | 29 |
| 84. $Sr_{0.50}Eu_{1.50}Mg_{1.75}Mn_{0.25}Al_{12}O_{22}$ | 192 | 97 | 517 | 26 |
| 85. $La_{0.93}Eu_{0.05}MgMn_{0.02}Al_{11}O_{19}$ | 110 | 83 | 452, 515 | 78, 40 |
| 86. $Na_{0.8}Eu_{0.2}Mg_2Mn_{0.2}Al_{14.8}O_{25}$ | 150 | 67 | 515 | 30 |
| 87. $Ba_{0.8}Eu_{0.2}Mg_{3.4}Mn_{0.6}Al_{20}O_{35}$ | 224 | 74 | 455, 515 | [3] |
| 88. $Ba_{0.8}Eu_{0.2}Mg_{5.4}Mn_{0.6}Al_{24}O_{43}$ | 210 | 72 | 455, 515 | [3] |
| 89. $Ba_{1.8}Eu_{0.2}Mg_{1.3}Mn_{0.7}Al_{28}O_{46}$ | 222 | 75 | 515 | [3] |
| 90. $Ba_{0.8}Eu_{0.2}Mg_{7.4}Mn_{0.6}Al_{28}O_{51}$ | 192 | 68 | 455, 515 | [3] |
| 91. $Ba_{1.6}Eu_{0.4}Zn_{4.2}Mn_{0.8}Al_{32}O_{55}$ | 191 | 71 | 515 | 25 |
| 92. $Ba_{2.8}Eu_{0.2}Mg_{1.3}Mn_{0.7}Al_{40}O_{65}$ | 199 | 77 | 514 | 28 |
| 93. $Ba_{3.8}Eu_{0.2}Mg_{1.3}Mn_{0.7}Al_{52}O_{84}$ | 195 | 75 | 513 | 30 |
| 94. $Ba_{4.8}Eu_{0.2}Mg_{1.3}Mn_{0.7}Al_{64}O_{103}$ | 178 | 74 | 513 | 31 |
| 95. $Sr_{9.25}Eu_{0.75}Mg_{7.4}Mn_{0.6}Al_{72}O_{126}$ | 206 | 71 | 465, 516 | [3] |
| 96. $Sr_{11.1}Eu_{0.9}Mg_{9.25}Mn_{0.75}Al_{84}O_{148}$ | 215 | 76 | 465, 516 | [3] |
| 97. $Sr_{12.95}Eu_{1.05}Mg_{11.1}Mn_{0.9}Al_{96}O_{170}$ | 212 | 77 | 465, 515 | [3] |

[1] Only the half value width of the manganese band was measured.
[2] In the examples 78 to 84 the europium and manganese emission largely coincide. The measurement in example 78 relates to the half value width of the total emission band.
[3] Not measured.

The materials according to Examples 54–64 in the above-given Table and further analogous compounds constitute a group of very efficient luminescent materials which have also a very favourable temperature dependence of the luminous flux. The material according to Example 54 has, for example, a quantum efficiency of 97%. A quantum efficiency of 86% was measured on the material according to Example 59 and when the temperature was raised, this material was found to have a luminous flux only at approximately 515° C. ($T_{50}$) being half that at room temperature. The peak height of the emission band of the material according to Example 59 to 130% measured with respect to the known manganese-activated magnesium gallate aluminate having the spinel structure. Very efficient luminescent materials are likewise found in the group of compounds analogous to the Examples 65-77.

It was found that upon activation of the aluminate lattices according to the invention both by cerium and terbium luminescent materials are obtained which upon excitation by ultraviolet radiation, particularly radiation originating from a low-pressure mercury vapour discharge yield very high luminous fluxes. The spectral distribution of the radiation emitted by these aluminates corresponds to that of the characteristic terbium emission consisting of a very high and narrow peak (half value width approximately 8 nm) at approximately 544 nm with a number of weaker side emissions. This proves that energy transfer takes place from cerium to terbium. For concentrations of cerium and terbium for which the ratio Ce/Tb is between 1.5 and 3 this transfer is substantially complete and efficient as is apparent from the efficiency of the terbium emission. The cerium and terbium-activated aluminates according to the invention may be very advantageously used in low-pressure mercury vapour discharge lamps intended for xerographic reproduction devices. Furthermore they can be used to advantage together with other luminescent materials as a green component in low-pressure mercury vapour discharge lamps for general illumination purposes. Furthermore they can be used in lamps having a high operating temperature because the temperature dependence of the luminous flux is satisfactory.

Examples of cerium and terbium-activated aluminates are included in the following Table. All materials given as an example are found to have a maximum emission at 544 nm and a half value width of approximately 8 nm upon excitation by short-wave ultraviolet radiation.

| Example | LO in % | A in % (254 nm) |
|---|---|---|
| 98. $Ce_{0.80}Tb_{0.20}MgAl_{11}O_{19}$ | 207 | 96 |
| 99. $Ce_{0.70}Tb_{0.30}MgAl_{11}O_{19}$ | 215[1] | 96 |
| 100. $Ce_{0.60}Tb_{0.40}MgAl_{11}O_{19}$ | 202 | 95 |
| 101. $La_{0.10}Ce_{0.80}Tb_{0.10}MgAl_{11}O_{19}$ | 180 | 96 |
| 102. $La_{0.20}Ce_{0.70}Tb_{0.10}MgAl_{11}O_{19}$ | 182 | 95 |
| 103. $La_{0.30}Ce_{0.60}Tb_{0.10}MgAl_{11}O_{19}$ | 177 | 95 |
| 104. $La_{0.50}Ce_{0.40}Tb_{0.10}MgAl_{11}O_{19}$ | 170 | 93 |
| 105. $La_{0.70}Ce_{0.20}Tb_{0.10}MgAl_{11}O_{19}$ | 154 | 89 |
| 106. $La_{0.10}Ce_{0.70}Tb_{0.20}MgAl_{11}O_{19}$ | 196 | 95 |
| 107. $La_{0.10}Ce_{0.60}Tb_{0.30}MgAl_{11}O_{19}$ | 208 | 95 |
| 108. $La_{0.20}Ce_{0.60}Tb_{0.20}MgAl_{11}O_{19}$ | 199 | 95 |

[1]measured: a quantum efficiency of 70% at 254 nm excitation.

Energy transfer in the aluminate fundamental lattices according to the invention is alternatively possible from cerium to dysprosium. The cerium and dysprosium-activated aluminates according to the invention are efficient luminescent materials which have their maximum emission at approximately 575 nm and which can be used to advantage in low-pressure mercury vapour discharge lamps.

| Example | LO in % | A in % (254 nm) |
|---|---|---|
| 109. $Ce_{0.90}Dy_{0.10}MgAl_{11}O_{19}$ | 79 | 96 |
| 110. $Ce_{0.80}Dy_{0.20}MgAl_{11}O_{19}$ | 56 | 96 |

The luminescent materials according to the invention in which the oxide B consists for at least 25 mol % of $Al_2O_3$ and which are activated by manganese or by manganese and europium have very high brightnesses upon excitation by cathode rays. Up to 75 mol % of the oxide B may consist of gallium oxide and optionally scandium oxide. For a higher content of the latter oxides a brightness which is less suitable for practical uses is found to be obtained. These luminescent materials according to the invention which are very efficient upon cathode-ray excitation may be advantageously used in cathode-ray tubes of green (activation by manganese) or green-blue (activation by manganese and europium) emission is desirable. A number of examples of these luminescent materials follows below. Each example is followed by the brightness in % with respect to a green-luminescing zinc oxide (known under the name "P40"). The brightness is measured at two values of the energy of the exciting electrons namely 2.5 and 5 KeV. Furthermore the emission colour is mentioned for each example.

| Example | brightness in % rel. to P40 | | colour |
|---|---|---|---|
| | 2.5 keV | 5 keV | |
| 111. $Sr_8Mg_{5.5}Mn_{0.5}Al_{60}O_{104}$ | 124 | 141 | green |
| 112. $Ba_8Mg_{5.5}Mn_{0.5}Al_{60}O_{104}$ | 113 | 128 | green |
| 113. $Sr_2Mg_{1.85}Mn_{0.15}Al_{12}O_{22}$ | 88 | 100 | green |
| 114. $BaMg_{1.9}Mn_{0.1}Al_{16}O_{27}$ | 147 | 170 | green |
| 115. $Sr_{7.2}Eu_{0.8}Mg_{5.6}Mn_{0.4}Al_{60}O_{104}$ | 157 | 173 | blue-green |
| 116. $Ba_{0.9}Eu_{0.1}Mg_{1.8}Mn_{0.2}Al_{16}O_{27}$ | 141 | 158 | blue-green |
| 117. $Ba_{1.8}Eu_{0.2}Mg_{1.3}Mn_{0.7}Al_{28}O_{46}$ | 151 | 170 | blue-green |

A further preferred group of luminescent materials according to the invention is constituted by the compounds in which the oxide B consists completely or for the greater part (i.e. at least for 75 mol %) of $Ga_2O_3$ and which are activated by manganese. These compounds (hereinafter denoted as gallates) may be satisfactorily excited by ultraviolet radiation particularly short-wave ultraviolet radiation while obtaining a very intensive emission in a narrow band (half value width between approximately 20 and 30 nm) with a maximum at approximately 500-510 nm. The manganese-activated gallates according to the invention may be advantageously used in low-pressure mercury vapour discharge lamps particularly in such lamps for use in xerographic reproduction processes. In fact it is possible to obtain luminous fluxes with the gallates according to the invention which are higher than those which are obtained with the known manganese-activated gallates and aluminate gallates having the spinel structure which have hitherto been used in lamps for xerography.

The Table below shows a number of examples of manganese-activated gallates according to the invention. Measurements of luminous flux and absorption of the exciting ultraviolet radiation are shown in the columns LO and A. The measurements are performed upon excitation by short-wave ultraviolet radiation (predominantly 254 nm) and the luminous flux is again stated in % with respect to the previously mentioned standard.

| Example | LO in % | A in % (254 nm) |
|---|---|---|
| 118. $LaMg_{0.997}Mn_{0.003}Ga_{11}O_{19}$ | 119 | 93 |
| 119. $Sr_{0.9}La_{0.1}Mg_{0.096}Mn_{0.004}Ga_{11}O_{19}$ | 196 | 96 |
| 120. $Sr_{0.75}La_{0.25}Mg_{0.246}Mn_{0.004}Ga_{11.75}O_{19}$ | 188 | 96 |
| 121. $Sr_{0.50}La_{0.50}Mg_{0.496}Mn_{0.004}Ga_{11.50}O_{19}$ | 176 | 95 |

-continued

| Example | LO in % | A in % (254 nm) |
|---|---|---|
| 122. $Sr_{0.25}La_{0.75}Mg_{0.746}Mn_{0.004}Ga_{11.25}O_{19}$ | 171 | 96 |
| 123. $Ba_{0.25}La_{0.75}Mg_{0.746}Mn_{0.004}Ga_{11.25}O_{19}$ | 188 | 95 |
| 124. $Sr_{0.25}La_{0.75}Mg_{0.743}Mn_{0.007}Ga_{11.25}O_{19}$ | 202 | 96 |
| 125. $Sr_{0.25}La_{0.75}Mg_{0.74}Mn_{0.01}Ga_{11.25}O_{19}$ | 169 | 96 |
| 126. $Sr_{0.25}La_{0.75}Zn_{0.743}Mn_{0.007}Ga_{10.05}Al_{1.2}O_{19}$ | 152 | 84 |
| 127. $Sr_{0.25}La_{0.75}Zn_{0.743}Mn_{0.007}Ga_{8.85}Al_{2.4}O_{19}$ | 121 | 66 |
| 128. $SrLi_{0.098}Ga_{0.098}Mn_{0.004}Ga_{11.8}O_{18.9}$ | 189 | 96 |
| 129. $SrLi_{0.198}Ga_{0.198}Mn_{0.004}Ga_{11.6}O_{18.8}$ | 175 | 95 |
| 130. $Sr_{0.8}La_{0.2}Li_{0.098}Ga_{0.098}Mn_{0.004}Ga_{11.8}O_{19}$ | 184 | 96 |
| 131. $Sr_{0.4}La_{0.6}Li_{0.298}Ga_{0.298}Mn_{0.004}Ga_{11.4}O_{19}$ | 141 | 96 |
| 132. $Ba_2Mg_{1.993}Mn_{0.007}Ga_{12}O_{22}$ | 164 | 91 |
| 133. $Ba_2Zn_{1.993}Mn_{0.007}Ga_{12}O_{22}$ | 90 | 78 |
| 134. $Ba_2Mg_{1.993}Mn_{0.007}Ga_{10.8}Al_{1.2}O_{22}$ | 133 | 65 |
| 135. $SrMg_{1.979}Mn_{0.021}Ga_{16}O_{27}$ | 98 | 95 |
| 136. $Sr_2Mg_{1.972}Mn_{0.028}Ga_{28}O_{46}$ | 120 | 96 |
| 137. $Sr_4Mg_{1.979}Mn_{0.021}Ga_{36}O_{60}$ | 68 | 96 |
| 138. $Sr_3Mg_{1.965}Mn_{0.035}Ga_{40}O_{65}$ | 108 | 96 |
| 139. $Ba_6Mg_{3.972}Mn_{0.028}Ga_{48}O_{82}$ | 76 | 79 |
| 140. $Sr_4Mg_{3.958}Mn_{0.042}Ga_{52}O_{86}$ | 114 | 97 |
| 141. $Sr_5Mg_{1.951}Mn_{0.049}Ga_{64}O_{103}$ | 104 | 97 |
| 142. $Ba_8Mg_{5.965}Mn_{0.035}Ga_{60}O_{104}$ | 72 | 77 |
| 143. $Ba_{10}Mg_{7.958}Mn_{0.042}Ga_{72}O_{126}$ | 74 | 77 |
| 144. $Ba_{12}Mg_{9.951}Mn_{0.049}Ga_{84}O_{148}$ | 83 | 73 |
| 145. $Ba_{14}Mg_{11.944}Mn_{0.056}Ga_{96}O_{170}$ | 83 | 73 |

Measurements of the emission spectrum of the materials according to Examples 118 to 145 show that $\lambda_{max}$ has a value of between 500 and 508 nm and that the half value width of the emission band ranges from 23 to 30 nm. The importance of manganese-activated gallates according to the invention for xerographic uses is apparent, for example, from the following measurements. The luminous flux of the material according to Example 124 measured with respect to the known manganese-activated spinel ($MgGa_{1.8}Al_{0.2}O_4$) is 107% while a peak height of the manganese emission band of 103% as compared with that of the spinel is measured. The luminous flux of the material according to Example 128, as compared with the said spinel, is 108% and the peak height is 130%.

The invention will now be described in greater detail with reference to a drawing and a number of examples of luminescent materials according to the invention.

Figure 10:
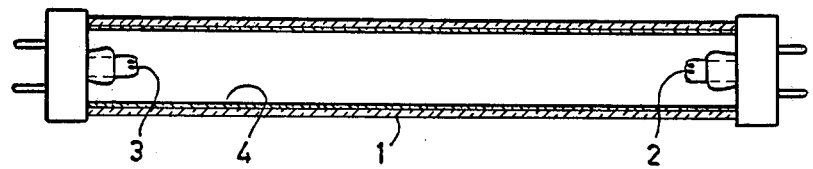

FIG. 10 diagrammatically shows a low-pressure mercury vapor discharge lamp according to the invention.

Figure 11:
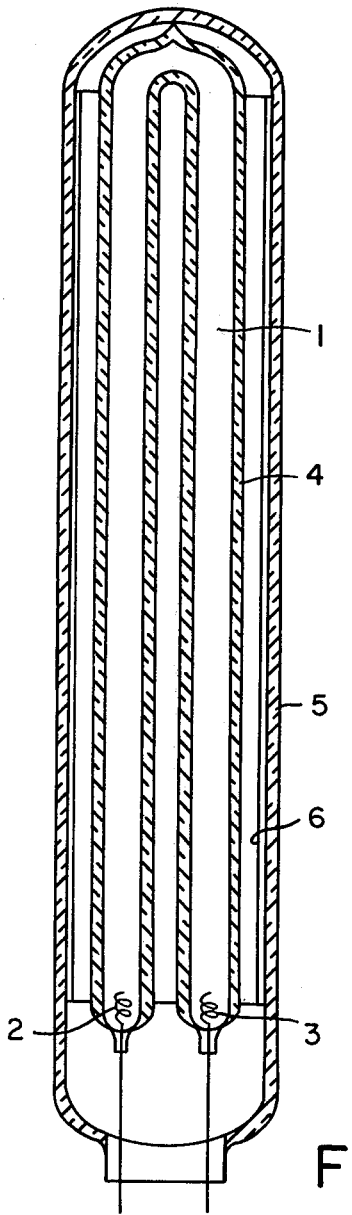

FIG. 11 shows schematically a low-pressure cadmium vapor discharge lamp according to the invention.

Figure 12:
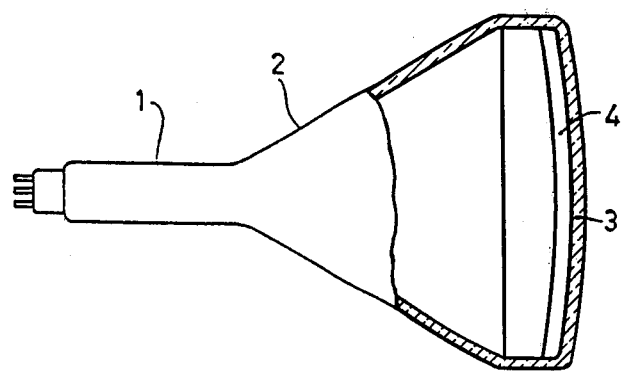

FIG. 12 shows, partly in section, a cathode-ray tube according to the invention.

FIG. 10 shows a low-pressure mercury vapor discharge lamp which includes an envelope 1. Electrodes 2 and 3 between which the discharge takes place during operation of the lamp, are provided at the ends of the lamp. The inner side of the envelope 1, which is made of, for example, glass is coated with a luminescent layer 4 which contains a luminescent material according to the present invention. The luminescent material may be provided on the envelope 1 by bringing a suspension of the luminescent material and nitrocellulose in butyl acetate into contact with the inner side of the envelope, whereby a thin layer of the suspension is left on the envelope. The nitrocellulose serves as a temporary adhesive. Then the envelope is subjected to a thermal treatment by which the temporary adhesive is removed and a satisfactory adhesion of the luminescent layer is obtained.

Referring to FIG. 11, reference numeral 1 designates a low-pressure cadmium-vapor discharge tube having the form of a U. 2 and 3 designate the cathodes. In the embodiment shown the wall 4 of this discharge tube is made of vitrous quartz. The discharge tube 1 is surrounded by an outer bulb 5, for example, of hard glass. 6 designates a layer of a luminescent material according to the present invention. The layer 6 is applied to the inner side of the outer bulb 5 by coating said inner side with a suspension containing the luminescent material and an organic binder, e.g. nitrocellulose. The coated bulb is then dried, after which the organic binder is removed by heating. The discharge tube 1 contains cadmium-vapor and a rare gas or a rare-gas mixture for starting the discharge and for improving the output.

FIG. 12 shows a cathode-ray tube which consists of a cylindrical part 1 and a frustoconical part 2. The part 2 is closed at one end with a face plate 3 of glass which is covered on its interior side with a luminescent screen 4. This screen contains a luminescent material according to the present invention.

The luminescent aluminates, gallates and aluminate gallates according to the invention may be manufactured by methods which are generally known for the synthesis of luminescent materials. The compounds according to the examples of the previous Tables are generally obtained by a solid-state reaction at an elevated temperature. To this end a mixture of starting materials is heated one or more times, for example, for an hour at a temperature of between approximately 1100° C. and the melting point of the compound to be formed. In practice approximately 1500° C. applies as an upper limit for the heating temperature. Starting materials are the oxides of the desired metals or compounds which constitute these oxides upon heating (for example, carbonates). The number of firing treatments and also the duration of these treatments is dependent on the reactivity of the starting mixture. This reactivity also determines the temperature at which the heat treatment is carried out. The heat treatments may be performed in an oxidizing atmosphere (for example, in air) in a neutral or in a weakly reducing atmosphere. If, for example, europium and/or manganese is used as an activator at least a (last) heat treatment in a weakly reducing atmosphere is generally necessary to bring these activators to the bivalent state.

In most cases a mixture comprising the composite metal oxides in quantities corresponding to the stoechiometry of the compound to be manufactured is used as a starting material for the manufacture of the luminescent materials according to the invention. It is, however, possible to admit deviations from the stoechiometry. As is known an excess of one or more of the starting materials may enhance the formation reaction. The elements used as an excess may remain present in addition to the luminescent compound and they are not disturbing provided they occur in small quantities. A starting material used as an excess may alternatively be separated from the luminescent compound by washing, if desired. A further known step to enhance the formation reaction is the use of a so-called flux. For example, the heat treatment may be performed on a mixture which comprises a melting salt soluble in water which is later removed by washing.

In order to enhance the growth of the aluminate grains and also to enhance building in of the activator in the fundamental lattice during manufacture of the luminescent aluminates according to the invention it is desirable in some cases to take extra steps. This applies particularly to the luminescent aluminate having a high manganese content. In order to obtain the said grain growth and activator build-in a part of the aluminium oxide (for example, 1–10 mol%) is preferably replaced by aluminium fluoride in the manufacture of these aluminates.

In the manufacture of aluminates according to the invention, in which the oxide C is MgO, it is also possible for this purpose to replace MgO in the firing mixture wholly or partly by manganesium fluoride. Subsequently at least a (last) heat treatment is performed in a water vapour-comprising atmosphere in which the aluminium fluoride and/or the magnesium fluoride is decomposed. In this manner a mean grain size of the luminescent aluminate of between 3 and 7$\mu$ can be obtained. Also when it is not desirable to enhance the grain growth the use of aluminium fluoride and/or magnesium fluoride in the firing mixture has advantages because lower firing temperatures can then be used.

The compounds in which the oxide A is an alkaline earth oxde or lanthanum oxide are generally manufactured by one or more heat treatments of a starting mixture at 1300° to 1500° C. The compounds in which the oxide A is an alkali oxide are generally manufactured by a heat treatment in air of a starting mixture comprising the alkali oxide in a relatively large excess (for example, twice the stoechiometrical quantity) in the form of the carbonate at a temperature of between 1100° and 1400° C. After cooling, the excess of alkali carbonate or alkali oxide is washed and a heat treatment in a weakly reducing atmosphere optionally follows. The compounds in which the oxide C is at least partly zinc oxide are preferably manufactured by a heat treatment at 1200°–1500° C. in a weakly reducing atmosphere, while one or more crucibles containing zinc oxide are present in addition to the firing mixture in the furnace.

In order to obtain a luminescent material according to the invention which comprises a relatively volatile activator (for example, thallium) the unactivated fundamental lattice is preferably manufactured firstly, for example, by one or more heat treatments in air of a suitable starting mixture. The activator compound is then added in an excess to the product obtained whereafter one or more heat treatments are performed at a relatively low temperature. During these heat treatment part of the activator is taken up in the lattice. The excess of the activator compound used is finally removed by washing.

In addition to solid-state reactions the luminescent materials according to the invention may alternatively be manufactured by precipitation from solutions, for example, in an aqueous medium. In the manufacture of, for example, $CeMgAl_{11}O_{19}$ and $(Ce, Tb)MgAl_{11}O_{19}$ by means of precipitation from solutions a satisfactorily crystallized product is obtained for which the X-ray diagram does not show any side phases. In the manufacture of the said luminescent aluminates through solid-state reaction it is found that at firing temperatures up to 1500° C. the desired luminescent phase is not obtained if no extra steps are taken and generally predominantly $CeAlO_3$, $\alpha\text{-}Al_2O_3$ and $MgAl_2O_4$ is formed.

The said luminescent aluminates may be obtained at firing temperatures of approximately 1500° C. if $CeO_2$, $Tb_4O_7$, $Mg_6$ and $Al_2O_3$ are used as starting materials, which are mixed as a suspension in water. After filtering and drying the mixture obtained is heated, for example, three times for one hour in a reducing atmosphere. The use of an excess of $Al_2O_3$, for example 10 mol%, appears to be advantageous in this manufacturing method.

The above-mentioned luminescent aluminates, and more generally the aluminates according to the invention in which the oxide A is $La_2O_3$, $Ce_2O_3$, $Tb_2O_3$ and/or $Dy_2O_3$, are preferably made from a firing mixture, in which $Al_2O_3$ is partly replaced by $AlF_3$ and/or in which MgO is wholly or partly replaced by $MgF_2$, and in which at least one firing is performed in a water vapour-comprising atmosphere. Relatively low firing temperatures, for example 1200° C. will then suffice.

All compounds according to the examples mentioned in the previous Tables are manufactured by methods as described above. It has been shown for all compounds with the aid of X-ray diffraction analyses that they have a hexagonal crystal structure which is related to the hexagonal ferrites or to $\beta$- or $\beta''$-alumina. More particularly it has been found that impurities having the spinel structure or $\alpha$-alumina do not occur in these compounds or occur only in the form of traces.

It is to be noted that the manufacture of the luminescent materials according to the invention has substantially not yet been optimized; as is known an optimum performance is obtained for each luminescent material only if a very specific choice of circumstances (such as firing temperature, firing atmosphere, firing duration, possible use of a flux, possible deviations from stoechiometry etc.) are used. It may be expected that when optimum results in the manufacture of the luminescent materials according to the invention are achieved, quantum efficiencies, luminous fluxes and brightnesses can be obtained which are still considerably higher than those mentioned above.

EXAMPLE I

The luminescent material according to example 8 of the Tables shown hereinbefore ($Ba_{0.9}Eu_{0.1}Al_{16}O_{27}$) is manufactured by starting from a mixture of:

8.880 g $BaCO_3$
0.880 g $Eu_2O_3$
4.031 g MgO 40.376 g $Al_2O_3$
1.104 g $AlF_3.3H_2O$.

This mixture is heated in a furnace for one hour in a weakly reducing atmosphere at 1400° C. The reducing atmosphere is obtained by passing a nitrogen stream comprising several % by volume of hydrogen into the furnace. After cooling, the product obtained is ground and sieved and subsequently once more heated for ½ hour at 1400° C. in a weakly reducing atmosphere. After cooling and pulverizing, the product is ready for use. The following Table includes the d-values (in Å) and the intensities (I in %) which were measured during an X-ray diffraction analysis of the luminescent powder thus obtained.

| d in Å | I in % | d in Å | I in % |
| --- | --- | --- | --- |
| 11.325 | <10 | 2.730 | 14 |
| 5.661 | <10 | 2.698 | 100 |
| 4.89 | 20 | 2.521 | 90 |
| 4.78 | 40 | 2.440 | 40 |
| 4.489 | 80 | 2.319 | 20 |
| 4.103 | 18 | 2.267 | 10 |
| 3.773 | <10 | 2.239 | 12 |
| 3.699 | 25 | 2.145 | 40 |
| 3.319 | 16 | 2.048 | 40 |
| 2.859 | 12 | 2.023 | 10 |
| 2.815 | 85 | 1.5999 | 40 |

EXAMPLE II

The luminescent material according to Example 59 of the Tables shown hereinbefore ($Ba_{0.8}Eu_{0.2}Mg_{1.4}Mn_{0.6}Al_{16}O_{27}$) is manufactured by heating a mixture of 8.31 g $BaCO_3$
1.85 g $Eu_2O_3$
2.97 g $MgO$
3.63 g $MnCO_3$
40.36 g $Al_2O_3$
6.97 g $AlF_3.3H_2O$ in a furnace for two hours at a temperature of 1200° C. The firing atmosphere is nitrogen with 8% by volume of hydrogen. After cooling and homogenizing, the product is heated for two hours at 1200° C. in a nitrogen stream comprising 8% by volume of hydrogen and 1.7% by volume of water. After cooling and pulverizing, the luminescent material is ready for use. The mean grain size of the material thus obtained is found to be 3.9μ.

EXAMPLE III

The luminescent material according to Example 99 of the Tables ($Ce_{0.7}Tb_{0.3}MgAl_{11}O_{19}$) is manufactured by making a solution of 0.007 mol $Ce(NO_3)_3.6H_2O$
0.010 mol $Mg(NO_3)_2.6H_2O$
0.110 mol $Al(NO_3)_3.9H_2O$ in approximately 150 mls of distilled water. Subsequently 0.561 g of fine $Tb_4O_7$ (0.003 mol Tb) is stirred through the solution whereafter ammonium hydroxide is added until a pH of 9–10 is obtained. Subsequently the precipitate then obtained is evaporated to dryness. The product obtained is then heated in air for two hours at 700° C. After cooling the product is pulverized and sieved and subsequently subjected to a heat treatment for one hour at 1500° C. in a weakly reducing atmosphere. After cooling, pulverizing and sieving the luminescent material is ready for use.

EXAMPLE IV

In the method according to Example III a relatively large liquid volume is used so that a long period of evaporation to dryness is required. This may be prevented by adding ammonium hydroxide to the terbium oxide-containing nitrate dolution until a pH is reached which is larger than or equal to 10.6. The magnesium is quantitatively precipitated. The precipitate is filtered and washed with ammonium hydroxide (pH 9–10). After drying the product obtained is subjected to the same temperature treatment as described in Example III.

EXAMPLE V

A mixture of 0.67 mol $CeO_2$
1.00 mol $MgO$
0.30 mol $AlF_3.3H_2O$
5.35 mol $Al_2O_3$
0.0825 mol $Tb_4O_7$ is heated in a furnace for one hour at a temperature of between 1000° and 1300° C. This heat treatment is effected in a reducing atmosphere consisting of nitrogen comprising 2% by volume of hydrogen. After cooling, grinding and sieving the product obtained is heated once more for one hour at 1200° C. in a water vapour-comprising atmosphere. This atmosphere is obtained by passing a nitrogen stream comprising approximately 2% by volume of hydrogen through water of 15° C. and subsequently through the furnace. After cooling grinding and sieving a tersium-activated cerium magnesium aluminate defined by the formula $Ce_{0.67}Tb_{0.33}MgAl_{11}O_{19}$ is obtained. The luminescent properties of this material may yet be further improved by a third heat treatment under the same circumstances as during the second heat treatment.

EXAMPLE VI

Starting from a mixture of 0.67 mol $CeO_2$
1.00 mol $MgF_2$
5.50 mol $Al_2O_3$
0.0825 mol $Tb_4O_7$ a luminescent aluminate of the same formula as the aluminate of Example V is obtained. The mixture is subjected to the same heat treatments as described in Example V with the distinction that all heat treatments are performed in a water vapour-comprising atmosphere. Said atmosphere is obtained in the same way as described in Example V.

EXAMPLE VII

Starting from a mixture of 0.67 mol $CeO_3$
1.00 mol $MgO$
1.00 mol $AlF_3.3H_2O$
5.00 mol $Al_2O_3$
0.0825 mol $Tb_4O_7$ a luminescent aluminate defined by the formula $Ce_{0.67}Tb_{0.33}MgAl_{11}O_{19}$ is obtained by proceeding in entirely the same way as described in Example VI.

Figure 1:
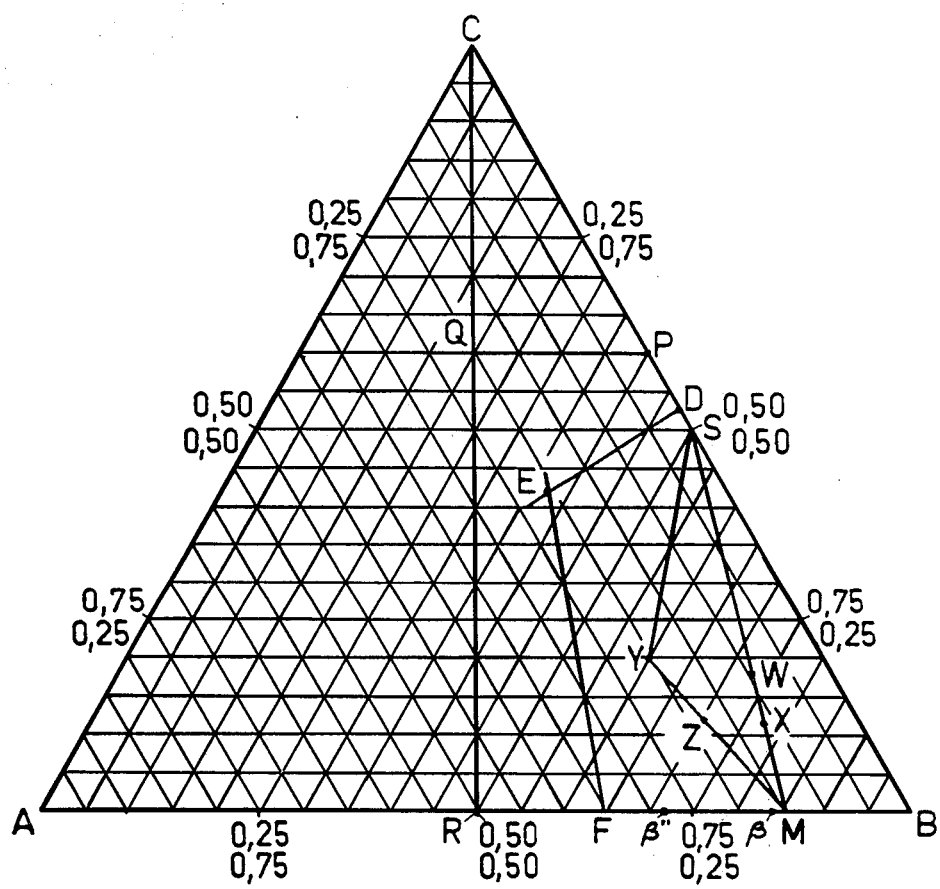
FIG. 1 shows the ternary phase diagram ABC already discussed hereinbefore.
Figure 2:
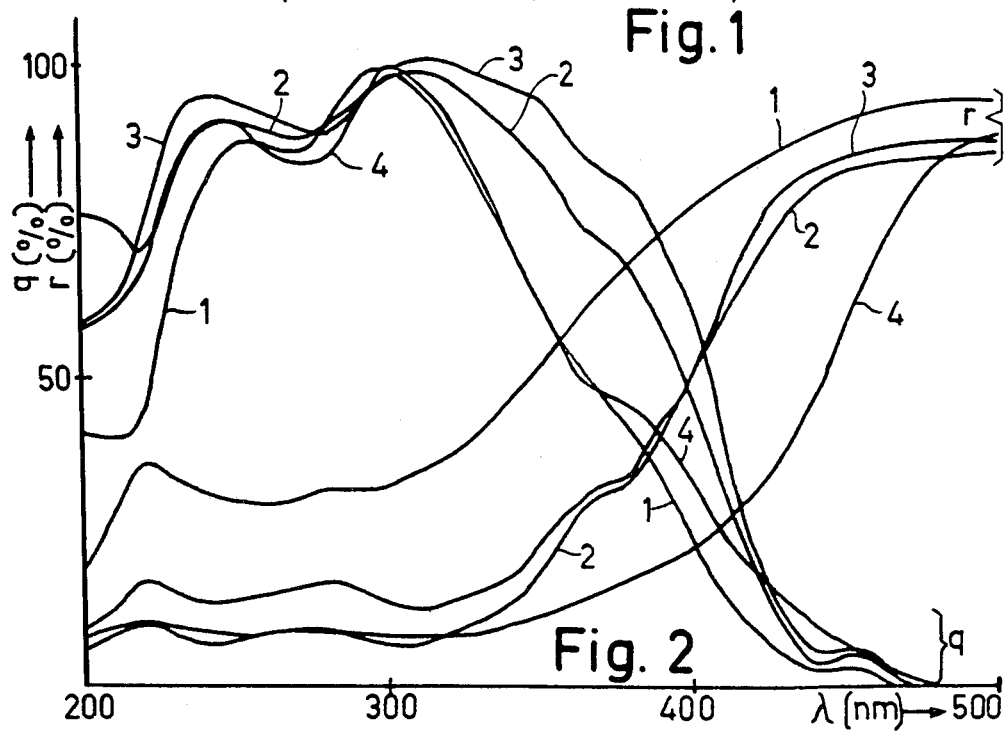
FIG. 2 shows the excitation and reflection spectrum of four europium and manganese-activated luminescent materials according to the invention and FIG. 3 shows the spectral energy distribution of these materials.

The graphs of FIG. 2 show the excitation spectrum (the curves denoted by q) and the reflection spectrum (the curves denoted by r) of four luminescent materials according to the invention. The excitation spectrum shows the relative quantum efficiency q in % as a function of the wavelength of the exciting radiation. The maximum quantum efficiency is fixed at 100 for each material. In addition to q the reflection r is plotted in % on the vertical axis. The wavelength λ is plotted in nm on the horizontal axis. The curves relate to the following materials:

curve 1: $Na_{0.8}Eu_{0.2}Mg_2Mn_{0.2}Al_{14.8}O_{25}$ (see Example 86)

curve 2: $Sr_{6.8}Eu_{1.2}Mg_{4.8}Mn_{1.2}Al_{60}O_{104}$ curve 3: $Ba_{0.8}Eu_{0.2}Mg_{1.4}Mn_{0.6}Al_{16}O_{27}$ (see Example 59)

curve 4: $Sr_{1.5}Eu_{0.5}Mg_{1.75}Mn_{0.25}Al_{12}O_{22}$ (see Example 81).

The graphs clearly show that the europium and manganese-activated luminescent materials according to the invention have a very broad excitation spectrum (satisfactory absorption of the exciting radiation over a broad wavelength interval and a high quantum efficiency at this exciting radiation). This also applies to the materials which are activated by europium only. These luminescent materials are thus very suitable for use in different types of lamps.

Figure 3:
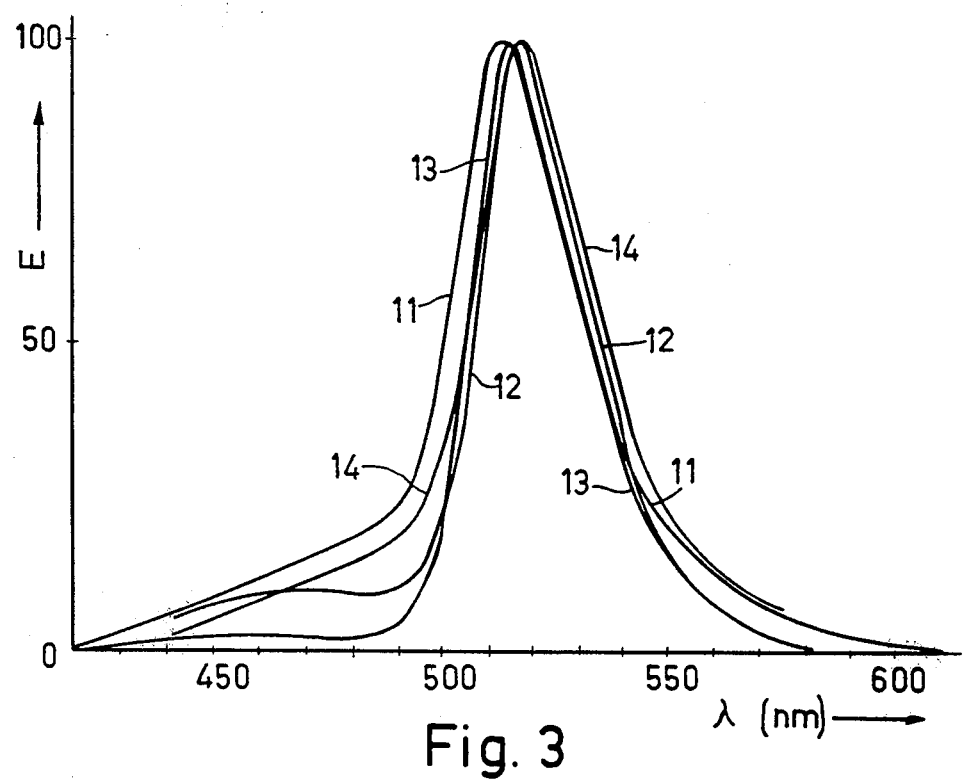

FIG. 3 shows the spectral energy distribution of the above-mentioned europium and manganese-activated aluminates. The wavelength λ is plotted in nm on the horizontal axis and the radiation energy E per constant wavelength interval is plotted in arbitrary units on the vertical axis. The excitation is effected by means of short-wave ultraviolet radiation (predominantly 254 nm). The curves 11, 12, 13 and 14 relate to the materials as mentioned for the curves 1, 2, 3 and 4, respectively, of FIG. 2. The maximum radiation energy is fixed at 100 for each curve.

Figure 4:
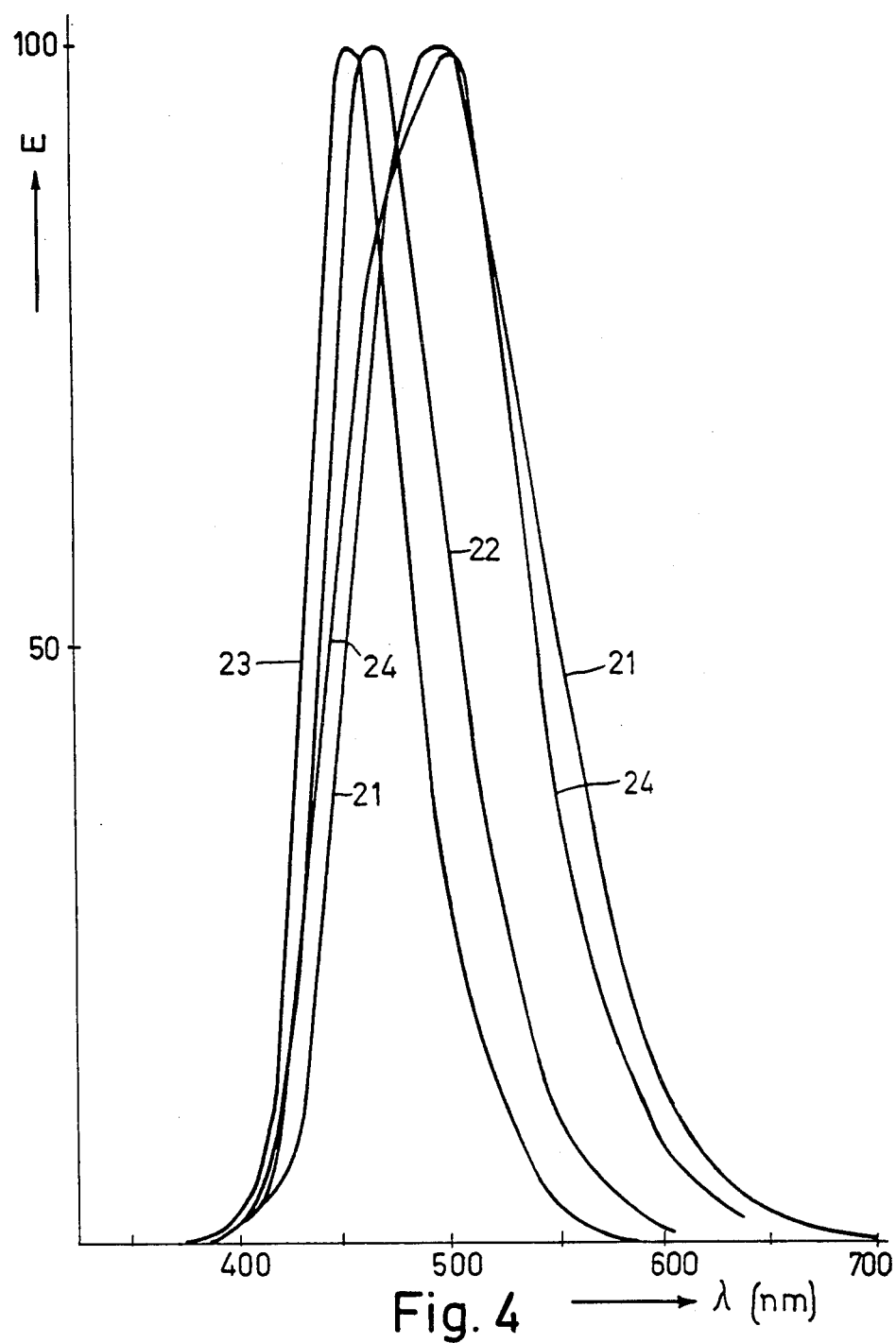
FIG. 4 shows the spectral energy distribution of four europium-activated luminescent materials according to the invention.

FIG. 4 shows in the same manner as FIG. 3 the spectral energy distribution of four luminescent materials according to the invention which are activated by europium. The curves relate to the following materials:

curve 21: $Na_{0.8}Eu_{0.2}Mg_{2.2}Al_{14.8}O_{25}$ (see Example 40)

curve 22: $Sr_{7.2}Eu_{0.8}Mg_6Al_{60}O_{104}$ curve 23: $Ba_{0.9}Eu_{0.1}Mg_2Al_{16}O_{27}$ (see Example 8)

curve 24: $Sr_{1.9}Eu_{0.1}Mg_2Al_{12}O_{22}$ (see Example 23).

Figure 5:
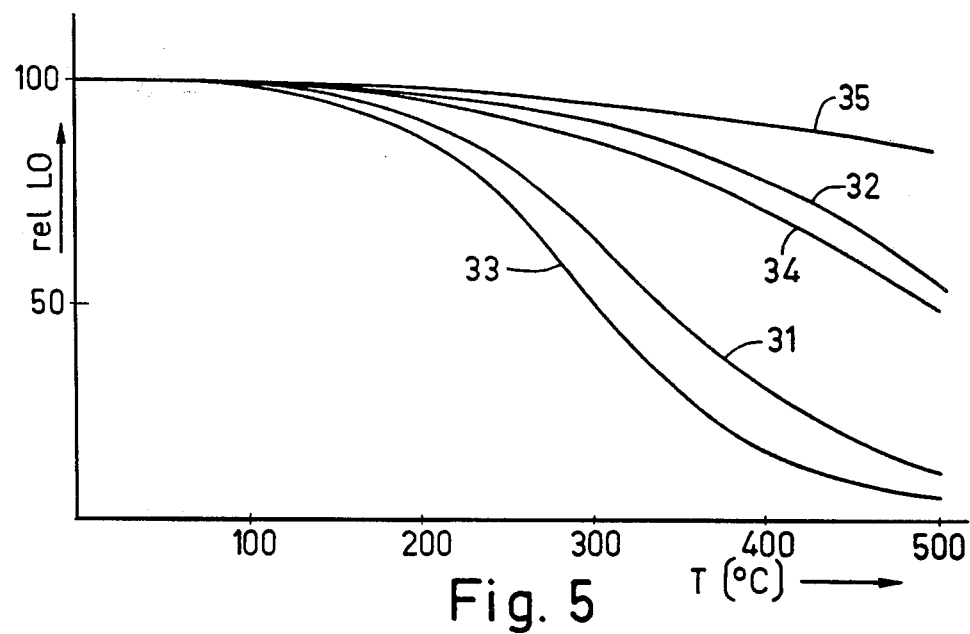
FIG. 5 is a graph showing the variation of the luminous flux of five luminescent materials according to the invention as a function of the temperature.

FIG. 5 shows a graph the relative luminous flux (el LO) of five materials according to the invention (upon excitation by short-wave ultraviolet radiation) as a function of the temperature T in °C. The luminous flux at room temperature is fixed at 100 for each material. The curves relate to the following materials:

curve 31: $Sr_{7.2}Eu_{0.8}Mg_{5.6}Mn_{0.4}Al_{60}O_{104}$ curve 32: $Ba_{0.8}Eu_{0.2}Mg_{1.6}Mn_{0.4}Al_{16}O_{27}$ (see Example 58)

curve 33: $Sr_{7.2}Eu_{0.8}Mg_6Al_{60}O_{104}$ curve 34: $Ba_{0.9}Eu_{0.1}Mg_2Al_{16}O_{27}$ (see Example 8)

curve 35: $Ce_{0.70}Tb_{0.30}MgAl_{11}O_{19}$ (see Example 99).

The graphs clearly show that these materials have a very favourable temperature dependence of the luminous flux.

Figure 6:
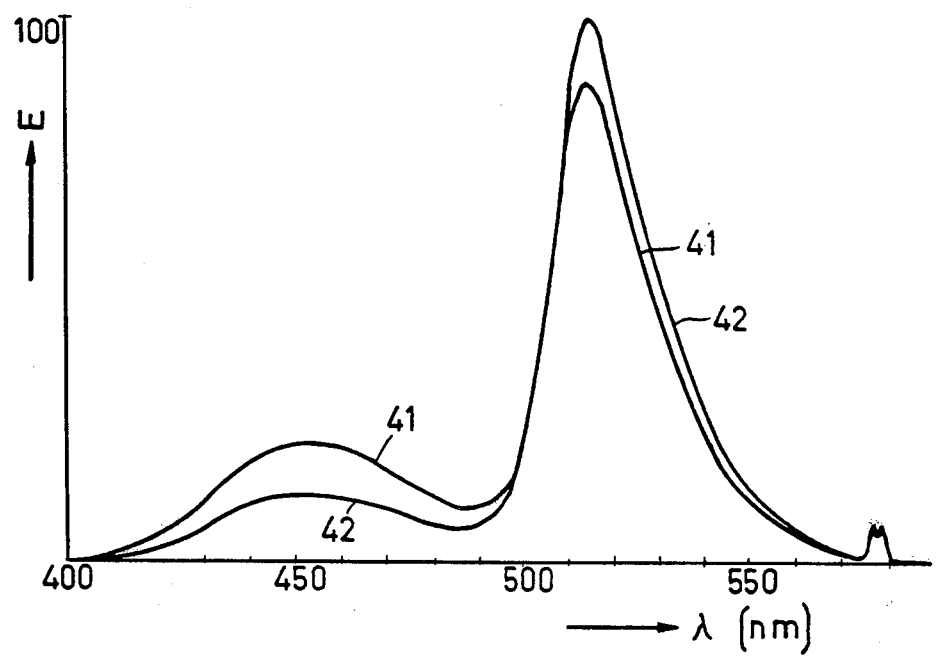
FIG. 6 shows the spectral energy distribution of two europium and manganese-activated aluminates according to the invention having different values for the ratio between manganese and europium concentrations.

FIG. 6 shows the spectral energy distribution of $Ba_{0.9}Eu_{0.1}Mg_{1.8}Mn_{0.2}Al_{16}O_{27}$ (see Example 54) as curve 41 and of $Ba_{0.9}Eu_{0.1}Mg_{1.7}Mn_{0.3}Al_{16}O_{27}$ (see Example 56) as curve 42. Excitation is effected by short-wave ultraviolet radiation. The maximum radiation energy for curve 42 is fixed at 100. This Figure shows that the relative contribution of the europium emission band and of the manganese emission band to the luminous flux can be adjusted by suitable choice of the value for the ratio between the manganese and europium concentrations. It has been found that the said relative contributions can be adjusted substantially steplessly.

Figure 7:
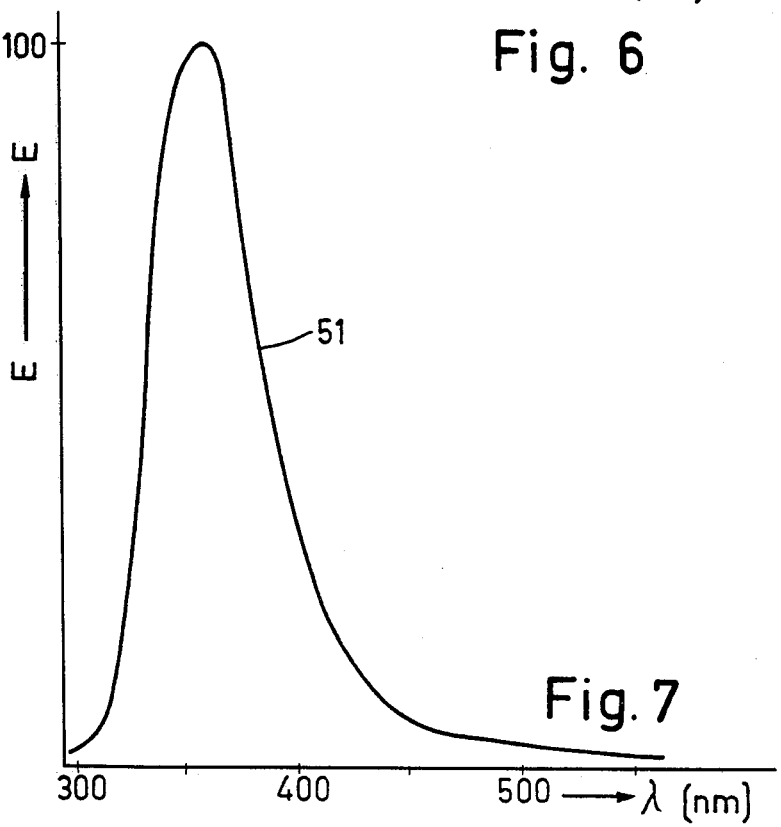
FIG. 7 shows the spectral energy distribution of a cerium-activated luminescent material according to the invention.

FIG. 7 shows the spectral energy distribution (curve 51) of the material according to Example 1 ($CeMgAl_{11}O_{19}$) upon excitation by short-wave ultraviolet radiation. The wavelength λ is plotted in nm on the horizontal axis and the radiation energy E per constant wavelength interval is plotted in arbitrary units on the vertical axis (the maximum energy is fixed at 100).

Figure 8:
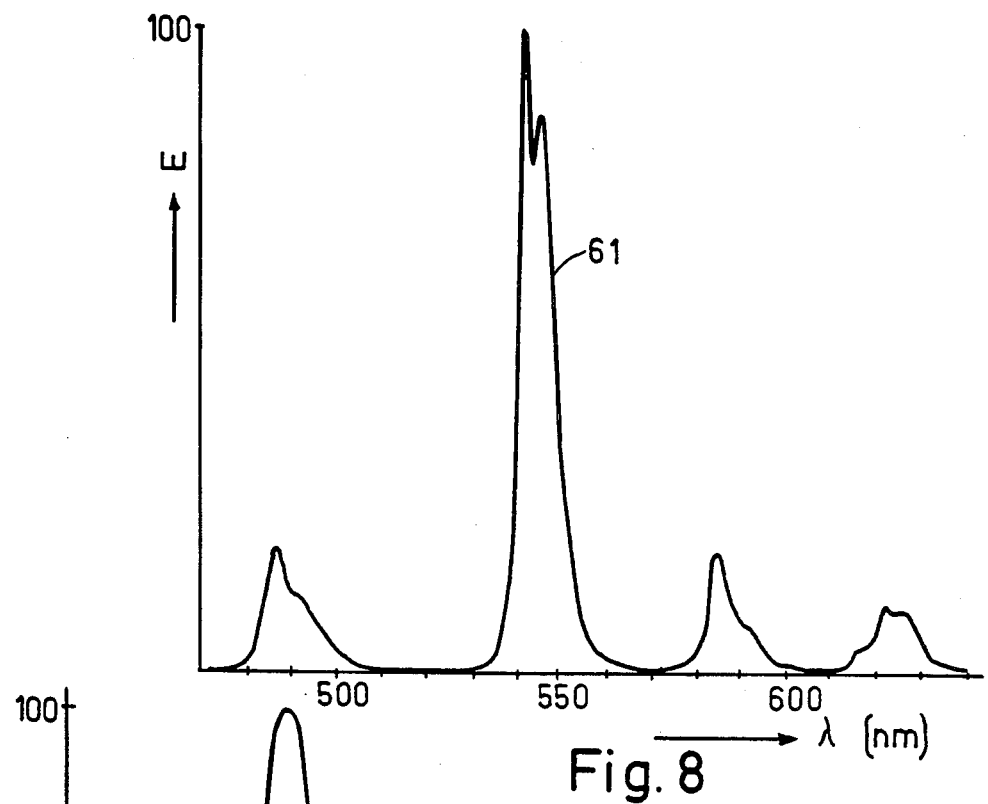
FIG. 8 shows the spectral energy distribution of a cerium and terbium-activated luminescent material according to the invention.

In FIG. 8 curve 61 shows in the same manner the spectral energy distribution of the material according to Example 99 ($Ce_{0.70}Tb_{0.30}MgAl_{11}O_{19}$).

Figure 9:
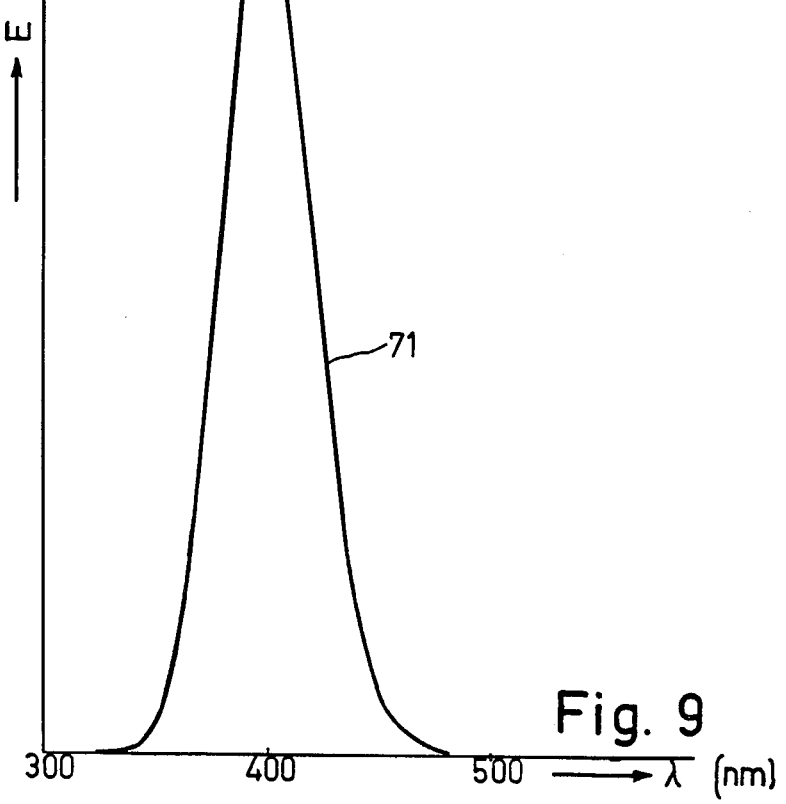
FIG. 9 shows the spectral energy distribution of an indium-activated luminescent material according to the invention.

Finally, FIG. 9 shows in an analogous manner the spectral energy distribution (curve 71) of the material according to Example 7. $(Ba, In) Mg_2Al_{16}O_{27}$).

What is claimed is:

1. A cerium activated luminescent material having a hexagonal crystal structure corresponding to β-alumina, β″-alumina or the hexagonal ferrites, said luminescent material comprising a compound of the oxides MeO, $Ce_2O_3$, MgO and $Al_2O_3$, wherein Me represents one of the elements calcium and strontium, and having a composition of the formula $$Me_{1-x}Ce_xMg_xAl_{12-x}O_{19},$$

wherein $0.01 \leq X \geq 1.0$.

2. A luminescent material of claim 1 wherein Me is strontium.

3. A luminescent material of claim 1 of the formula $Sr_{0.95}Ce_{0.05}Mg_{0.05}Al_{11.95}O_{19}$.

4. A low-pressure mercury vapor discharge lamp provided with the luminescent material of claim 1.

* * * * *

UNITED STATES PATENT AND TRADEMARK OFFICE
CERTIFICATE OF CORRECTION

PATENT NO. : 4,441,049
DATED      : April 3, 1984
INVENTOR(S) : JUDICUS M.P.J. VERSTEGEN et al It is certified that error appears in the above-identified patent and that said Letters Patent is hereby corrected as shown below:

On the Title Page (60), line 4,

"2976" should be --1976--.

Signed and Sealed this

Twenty-sixth Day of June 1984

[SEAL]

Attest:

GERALD J. MOSSINGHOFF

Attesting Officer        Commissioner of Patents and Trademarks